US011496447B1

(12) United States Patent
Eid

(10) Patent No.: US 11,496,447 B1
(45) Date of Patent: Nov. 8, 2022

(54) CRYPTOSYSTEM AND METHOD WITH EFFICIENT ELLIPTIC CURVE OPERATORS FOR AN EXTRACTION OF EISI COORDINATE SYSTEM

(71) Applicant: Umm Al-Qura University, Mecca (SA)

(72) Inventor: Wesam Eid, Mecca (SA)

(73) Assignee: Umm AI-Qura University, Mecca (SA)

(*) Notice: Subject to any disclaimer, the term of this patent is extended or adjusted under 35 U.S.C. 154(b) by 0 days.

(21) Appl. No.: 17/232,723

(22) Filed: Apr. 16, 2021

(51) Int. Cl.
| H04L 29/06 | (2006.01) |
| H04L 9/40  | (2022.01) |
| H04L 9/30  | (2006.01) |
| H04L 9/08  | (2006.01) |
| G06F 7/72  | (2006.01) |

(52) U.S. Cl.
CPC .......... H04L 63/0428 (2013.01); G06F 7/725 (2013.01); H04L 9/0841 (2013.01); H04L 9/0861 (2013.01); H04L 9/3066 (2013.01)

(58) Field of Classification Search
CPC . H04L 63/0428; H04L 9/0841; H04L 9/0861; H04L 9/3066; G06F 7/725
USPC ........................................................ 713/150
See application file for complete search history.

(56) References Cited

U.S. PATENT DOCUMENTS

| 6,490,352 | B1 | 12/2002 | Schroeppel |
| 10,116,443 | B1 | 10/2018 | Kalach et al. |
| 10,581,604 | B2* | 3/2020 | Mustafa ............... H04L 9/302 |
| 10,880,278 | B1* | 12/2020 | de Quehen ........... H04L 9/0838 |
| 11,153,080 | B1* | 10/2021 | Nix ....................... H04L 9/3247 |
| 11,210,067 | B1* | 12/2021 | Koziel ..................... G06F 7/728 |
| 11,223,470 | B1* | 1/2022 | Shea ..................... H04L 9/3239 |
| 11,240,014 | B1* | 2/2022 | Maganti .............. G06F 16/2219 |
| 2018/0323973 | A1* | 11/2018 | Soukharev ............. G06F 7/725 |
| 2019/0165936 | A1* | 5/2019 | Brown .................. H04L 9/0841 |
| 2019/0325166 | A1* | 10/2019 | Suresh ................... G06F 21/76 |
| 2020/0044846 | A1 | 2/2020 | Soukharev et al. |

(Continued)

FOREIGN PATENT DOCUMENTS

TW M596498 U 6/2020

*Primary Examiner* — Amare F Tabor
(74) *Attorney, Agent, or Firm* — Oblon, McClelland, Maier & Neustadt, L.L.P.

(57) ABSTRACT

A system, method and computer-readable medium provide secure communication between a first and a second computer system based on supersingular isogeny elliptic curve cryptography. The first computer system and the second computer system each determine kernels $K_A$ and $K_B$ including computing mP+nQ by accessing a lookup table stored in a memory that contains a range of doubles of an end point of the respective kernels, where P and Q are points on the public elliptic curve and m and n are integers. The first computer system and the second computer system compute secret isogenies by determining a respective kernel $K_{BA}$ and $K_{AB}$ using mixed-base multiplicands with a single inversion, including computing the respective kernel $K_{BA}$ and $K_{AB}$ by converting the multiplicands to base 32, and computing scalar multiplications using the base 32 multiplicands.

20 Claims, 16 Drawing Sheets

(56) References Cited

U.S. PATENT DOCUMENTS

| | | |
|---|---|---|
| 2020/0025964 A1 | 8/2020 | Koziel |
| 2020/0274701 A1* | 8/2020 | Yuan .................... H04L 9/0643 |
| 2020/0328885 A1* | 10/2020 | Tola ..................... H04L 9/3066 |
| 2021/0083854 A1* | 3/2021 | Takashima ............. G06N 10/00 |
| 2021/0281404 A1* | 9/2021 | Kampanakis ............ H04L 9/14 |

* cited by examiner $2P = (5, 1) + (5, 1) = (6, 3)$   $11P = (13, 10)$
$3P = 2P + P = (10, 6)$   $12P = (0, 11)$
$4P = (3, 1)$   $13P = (16, 4)$
$5P = (9, 16)$   $14P = (9, 1)$
$6P = (16, 13)$   $15P = (3, 16)$
$7P = (0, 6)$   $16P = (10, 11)$
$8P = (13, 7)$   $17P = (6, 14)$
$9P = (7, 6)$   $18P = (5, 16)$
$10P = (7, 11)$   $19P = O$

```
2P
Found 2P
Output = (6,3)
----------------------------------
9P = 8P + P
Found 4P
Found 8P
Found 9P
Output = (7,6)
----------------------------------
24P = 16P + 8P
Found 16P
```

FIG. 13

```
29P = 32P - 3P
Found 2P
Found 4P
Found 8P
Found 16P
Found 32P
Found 3P
Found 29P
Output = (7,11)
─────────────────
11P = 8P + 3P
Found 11P
Output = (13,10)
```

FIG. 14

CRYPTOSYSTEM AND METHOD WITH EFFICIENT ELLIPTIC CURVE OPERATORS FOR AN EXTRACTION OF EISI COORDINATE SYSTEM

STATEMENT OF ACKNOWLEDGEMENT

The inventor would like to acknowledge the support provided by the Deanship of Scientific Research at Umm Al-Qura University for supporting this work by Grant Code #20UQU0026DSR

BACKGROUND

Field of the Invention

The disclosure relates to Supersingular Isogeny Diffie-Helman cryptosystem for secure electronic communication between two parties, and in particular, a system and method that minimizes the number of multiplications and inversions in computing the kernel of the elliptic curve.

Background

An objective of a cryptosystem is to minimize complexity of the cryptographic algorithm while making it computationally difficult to detect a secure key that results from the cryptographic algorithm. Efficiency of secure communication that is impacted by the complexity of the algorithm is especially important to end users that desire fast communication of messages despite security risks. Complexity of a cryptographic algorithm may be minimized by optimizing factors including reducing the number of computations and reducing the amount of computer resources, such as storage space, needed to perform the algorithm. For example, in the case of key exchange for secure communications, reducing the total data size stored in a communications device and the total computation amount by a communications device are important factors. At the same time, security of communication continues to be an ever increasing challenge. For example, specialized computer systems are being developed that are better able to compromise existing cryptosystem algorithms, i.e., can determine the secure key and/or decipher the encrypted message within the regular time frame of message transmission. Attacks that can compromise cryptosystems are not necessarily limited to independent calculations and might also be based on analyzing hardware behaviors such as the case with the Side Channel Attack (SCA). There is an ongoing need to develop cryptosystems that can withstand attacks by future specialized computer systems.

Secure Internet-based communications generally rely on public-key cryptography, which allows entities to communicate without the need for sharing confidential material in advance. Elliptic Curve Cryptography (ECC), proposed in 1985, is still a predominant type of public-key cryptography. See L. B. Oliveira, F. M. Q. Pereira, R. Misoczki, D. F. Aranha, F. Borges, M. Nogueira, M. Wangham, M. Wu, and J. Liu, "The computer for the 21st century: present security & privacy challenges," Journal of Internet Services and Applications, vol. 9, no. 1, p. 24, 2018, incorporated herein by reference in its entirety. ECC is one of the existing cryptosystem algorithms that is commonly used for encrypted emails, online banking, secure ecommerce websites, digital signatures, and other data transfer applications where the size of the storage space for public keys is an issue. Breaching these would have significant effects on society. The adoption of ECC has been accelerated by recommendations from an array of standardization entities, including, NIST, IETF, and ANSI (NIST, 2016). Compared to competitors like RSA and Elgamal, elliptic curve cryptography introduced some of the most efficient public key cryptosystems (PKC) for desirable security. More recently, while there are known quantum and classical attacks that can breach cryptographic protocols based on supersingular isogeny graphs (SIGs), the Supersingular isogeny Diffie-Hellman (SIDH) technique has been found to be able handle quantum-based attacks.

Specialized computer systems, such as quantum computers, are being developed and can break elliptic curve-based cryptosystems. Developments in quantum computer systems threaten to break elliptic curve and factoring techniques for public key cryptography.

Although quantum computers are currently in their infancy, the ongoing development of quantum computers and their theoretical ability to compromise modern cryptographic protocols (such as TLS/SSL) has prompted the development of post-quantum cryptography.

A Supersingular Isogeny Diffie-Hellman (SIDH) key exchange has been developed to withstand attacks by techniques that use quantum computers. Subsequently, SIDH is one of the post-quantum cryptographic algorithms that can offer secure key exchanges between communicating entities over insecure communication channels. See S. Arpin, C. Camacho-Navarro, K. Lauter, J. Lim, K. Nelson, T. Scholl, and J. Sotáková, "Adventures in supersingularland," arXiv preprint arXiv: 1909.07779, 2019; and C. Costello, P. Longa, and M. Naehrig, "Efficient algorithms for supersingular isogeny diffie-hellman," in Annual International Cryptology Conference. Springer, 2016, pp. 572-601, each incorporate herein by reference in their entirety.

In algebraic geometry, supersingular elliptic curves form a certain class of elliptic curves over a field of characteristic $p>0$ with unusually large endomorphism rings. The term "supersingular" comes from the phrase "singular values of the j-invariant" used for values of the j-invariant for which a complex elliptic curve has complex multiplication. The complex elliptic curves with complex multiplication are those for which the endomorphism ring has the maximal possible rank 2. In positive characteristic it is possible for the endomorphism ring to be even larger: it can be an order in a quaternion algebra of dimension 4, in which case the elliptic curve is supersingular.

The core operations for SIDH are the computation of the isogeny and of its kernel. Basically, Velu's formula is used to compute the isogeny, and the P+k [Q] formula is used to compute the kernel. In elliptic curve point multiplication, P and Q are initial and final points on the curve, and k is the size of the underlying field. In key exchange, P and Q are points on the curve and k is the secret key that is generated by both parties. See D. Jao and L. De Feo, "Towards quantum-resistant cryptosystems from supersingular elliptic curve isogenies," in International Workshop on Post-Quantum Cryptography. Springer, 2011, pp. 19-34, incorporated herein by reference in its entirety. The complexity of SIDH relies on the difficulty of finding isogenies besides computing the scalar multiplication in the kernel formula. Point multiplication mainly relies on elliptic curve point addition and point doubling operations. Thus, speeding up elliptic curve (EC) computations will not only benefit the applications that rely on ECC, but also has an effective impact on the post quantum cryptosystem SIDH. Moreover, attacks are not necessarily limited to independent calculations and might also be based on analyzing hardware behaviors such as with the Side Channel Attack (SCA). As attackers analyze electrical power consumption patterns, which differ between performing point addition or point doubling, they can recover the secret key. Therefore, the development criteria for EC algorithms and systems can include aspects other than speed. For instance, the addition in the Montgomery coordinates system is resistant to such attacks. See P. L. Montgomery, "Speeding the pollard and elliptic curve methods of factorization," Mathematics of computation, vol. 48, no. 177, pp. 243-264,1987, incorporated herein by reference in its entirety. A drawback of the Montgomery coordinates system is that it is slower than other coordinates systems such as Projective and Jacobian. See L. C. Washington, Elliptic curves: number theory and cryptography. Chapman and Hall/CRC, 2008, incorporated herein by reference in its entirety.

There is a need for effective algorithms for EC systems that provide computational speedup and resistance to side-channel attacks.

SUMMARY

An aspect is a system for secure communication. The system can include a first computer system, a communication network, and a second computer system. The first computer system and the second computer system are each provided with a public elliptic curve E. The first computer system and the second computer system each independently determine kernels $K_A$ and $K_B$, respectively, and an isogeny mapping using the public elliptic curve E. The first computer system and the second computer system each independently determine mapped points based on the respective isogeny mappings. The first computer system and the second computer system each exchange the determined mapped points. The first computer system and the second computer system each independently compute the coefficients of two different secret elliptic curves under two different secret isogenies. The first computer system and the second computer system each independently compute a common secret key using the secret elliptic curves and the secret isogenies. The first computer system and the second computer system exchange messages using the common secret key. The first computer system and the second computer system each determine kernels $K_A$ and $K_B$ including computing mP+nQ by accessing a lookup table stored in a memory that contains a range of doubles of an end point of the respective kernels, where P and Q are points on the public elliptic curve and m and n are integers.

A further aspect is a supersingular isogeny-based cryptography method. The method can include providing a first computer system and a second computer system with a public elliptic curve E, independently determining, by the first computer system and the second computer system, kernels $K_A$ and $K_B$, respectively, and an isogeny mapping using the public elliptic curve E, independently determining, by the first computer system and the second computer system, mapped points based on the respective isogeny mappings, exchanging, between the first computer system and the second computer system, the determined mapped points, independently computing, by the first computer system and the second computer system, coefficients of two different secret elliptic curves under two different secret isogenies, independently determining, by the first computer system and the second computer system, a common secret key using the secret elliptic curves and the secret isogenies, and exchanging, between the first computer system and the second computer system, messages using the common secret key. The first computer system and the second computer system each determine kernels $K_A$ and $K_B$ including computing mP+nQ by accessing a lookup table stored in a memory that contains a range of doubles of an end point of the respective kernels, where P and Q are points on the public elliptic curve and m and n are integers.

A further aspect is a non-transitory computer-readable medium storing instructions that are operable when executed by processing circuitry to perform operations. The operations can include receiving a public elliptic curve E, independently determining kernels $K_A$ and $K_B$, respectively, and an isogeny mapping using the public elliptic curve E, independently determining mapped points based on the respective isogeny mappings, exchanging the determined mapped points, independently computing coefficients of two different secret elliptic curves under two different secret isogenies, independently determining a common secret key using the secret elliptic curves and the secret isogenies, and exchanging messages using the common secret key, and determining kernels $K_A$ and $K_B$ by computing mP+nQ by accessing a lookup table stored in a memory that contains a range of doubles of an end point of the respective kernels, where P and Q are points on the public elliptic curve and m and n are integers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 13 illustrates computing the point 24P by using remi_func and remi_point functions;

FIG. 14 illustrates computing the point 29P by using remi_func and remi_point functions;

DETAILED DESCRIPTION

Figure 1:
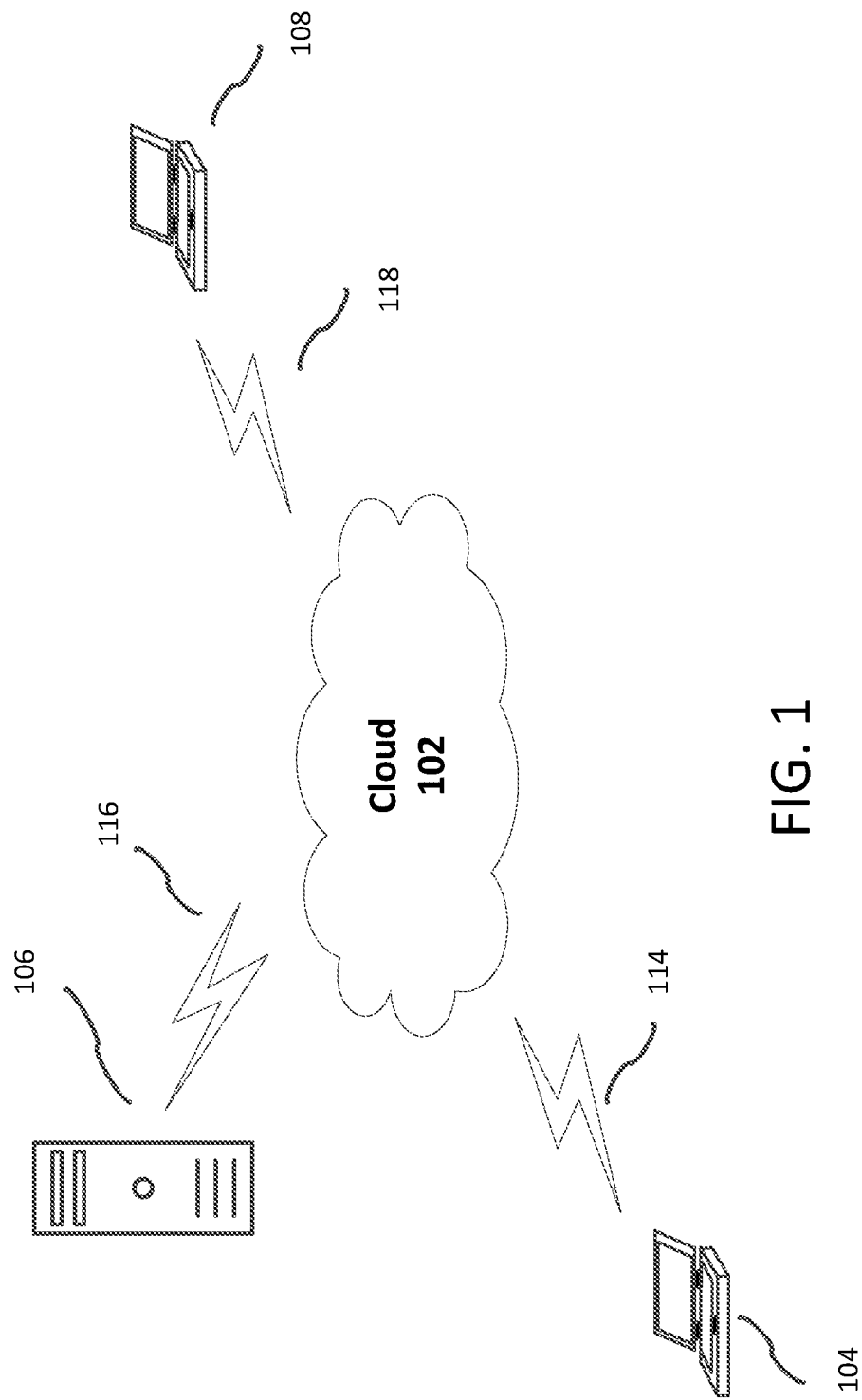
FIG. 1 is a diagram of a communications system providing secure communication.

As mentioned above, secure Internet-based communications generally rely on public-key cryptography, which allows entities to communicate without the need for sharing confidential material in advance. FIG. 1 is a diagram of a communications system providing secure communication. In one or more embodiments, a first computer system 104 may communicate with a second computer system 108 over the Internet 102. The first computer system 104 may communicate over a secure communications channel 114. The second computer system 108 may communicate over a secure communication channel 118. A server computer 106 may be accessed through the Internet 102 by way of a communication channel 116. The server computer 106 may be a single computer system that can be accessed via communications protocol such as the Internet, or may be multiple server computers in interconnected arrangements, such as hierarchical, series or parallel. The first computer system 104 may communicate with the second computer system 108 securely by encrypting a message using a secret key independently computed by each computer system 104 and 108 using the Diffie-Hellman technique.

The first computer system 104 and the second computer system 108 may include mobile computing devices and/or desktop computing devices to be used by end users for communication by way of the Internet. Mobile computing devices are not limited to, but may include smartphones, tablet computers, laptop computers, handheld gaming devices and other portable computing devices. Desktop computers may range from all-in-one display-computing devices to computer workstations. Desktop computers may also include gaming stations, such as PlayStation, Nintendo switch, Microsoft Xbox, to name few.

Figure 2:
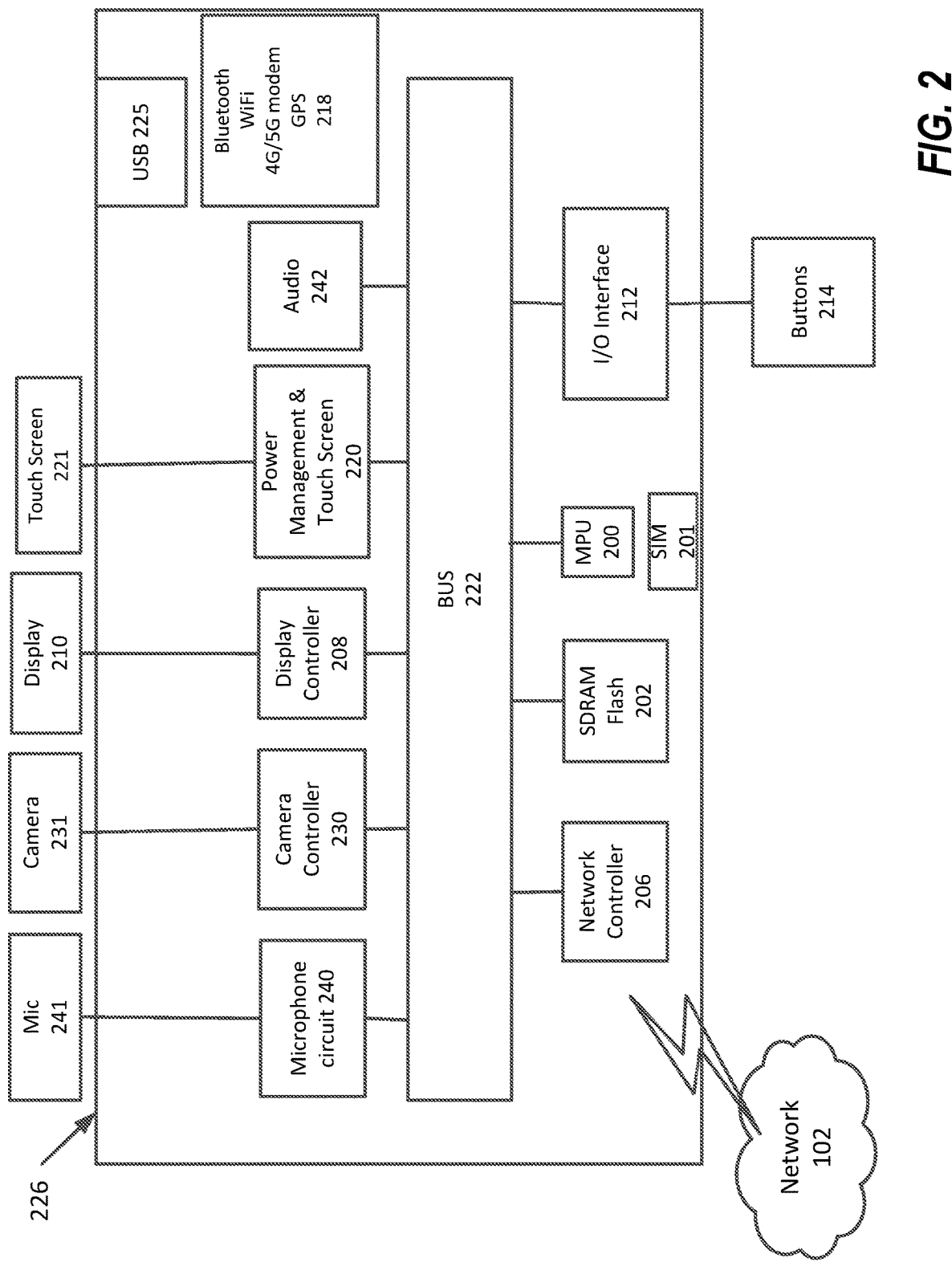
FIG. 2 is an exemplary computer system in the communications system of FIG. 1.

In one implementation, the functions and processes of the first computer system 104 and the second computer system 108 may be implemented by one or more respective processing circuitry 226. Processing circuitry includes a programmed processor as a processor includes circuitry. Processing circuitry may also include devices such as an application specific integrated circuit (ASIC) and conventional circuit components arranged to perform the recited functions. Note that processing circuitry refers to a circuit or system of circuits. Herein, the processing circuitry may be in one computer system (as illustrated in FIG. 2) or may be distributed throughout a network of computer systems. Hence, the processing circuitry of the server computer system 106 for example may be in only one server or distributed among different servers/computers.

Next, a hardware description of the processing circuitry 226 according to exemplary embodiments is described with reference to FIG. 2. In FIG. 2, the processing circuitry 226 may include a Mobile Processing Unit (MPU) 200 which performs the processes described herein. The process data and instructions may be stored in memory 202. These processes and instructions may also be stored on a portable storage medium or may be stored remotely. The processing circuitry 226 may have a replaceable Subscriber Identity Module (SIM) 201 that contains information that is unique to the network service of the mobile device 130.

Further, the claimed advancements are not limited by the form of the computer-readable media on which the instructions of the inventive process are stored. For example, the instructions may be stored in FLASH memory, Secure Digital Random Access Memory (SDRAM), Random Access Memory (RAM), Read Only Memory (ROM), Programmable Read-Only Memory (PROM), Erasable Programmable Read-Only Memory (EPROM), Electrically Erasable Programmable Read Only Memory (EEPROM), solid-state hard disk or any other information processing device with which the processing circuitry 226 communicates, such as a server or computer.

Further, the claimed advancements may be provided as a utility application, background daemon, or component of an operating system, or combination thereof, executing in conjunction with MPU 200 and a mobile operating system such as Android, Microsoft® Windows® 10 Mobile, Apple iOS® and other systems known to those skilled in the art.

In order to achieve the processing circuitry 226, the hardware elements may be realized by various circuitry elements, known to those skilled in the art. For example, MPU 200 may be a Qualcomm mobile processor, a Nvidia mobile processor, a Atom® processor from Intel Corporation of America, a Samsung mobile processor, or a Apple A7 mobile processor, or may be other processor types that would be recognized by one of ordinary skill in the art. Alternatively, the MPU 200 may be implemented on an Field-Programmable Gate Array (FPGA), Application Specific Integrated Circuit (ASIC), Programmable Logic Device (PLD) or using discrete logic circuits, as one of ordinary skill in the art would recognize. Further, MPU 200 may be implemented as multiple processors cooperatively working in parallel to perform the instructions of the inventive processes described above.

The processing circuitry 226 in FIG. 2 also includes a network controller 206, such as an Intel Ethernet PRO network interface card from Intel Corporation of America, for interfacing with network 102. As can be appreciated, the network 102 can be a public network, such as the Internet, or a private network such as LAN or WAN network, or any combination thereof and can also include PSTN or ISDN sub-networks. The network 102 can also be wired, such as an Ethernet network. The processing circuitry 226 may include various types of communications processors for wireless communications including 3G, 4G and 5G wireless modems, WiFi®, Bluetooth®, GPS, or any other wireless form of communication that is known.

The processing circuitry 226 includes a Universal Serial Bus (USB) controller 225 which may be managed by the MPU 200.

The processing circuitry 226 further includes a display controller 208, such as a NVIDIA® GeForce® GTX or Quadro® graphics adaptor from NVIDIA Corporation of America for interfacing with display 210. An I/O interface 212 interfaces with buttons 214, such as for volume control. In addition to the I/O interface 212 and the display 210, the processing circuitry 226 may further include a microphone 241 and one or more cameras 231. The microphone 241 may have associated circuitry 240 for processing the sound into digital signals. Similarly, the camera 231 may include a camera controller 230 for controlling image capture operation of the camera 231. In an exemplary aspect, the camera 231 may include a Charge Coupled Device (CCD). The processing circuitry 226 may include an audio circuit 242 for generating sound output signals, and may include an optional sound output port.

The power management and touch screen controller 220 manages power used by the processing circuitry 226 and touch control. The communication bus 222, which may be an Industry Standard Architecture (ISA), Extended Industry Standard Architecture (EISA), Video Electronics Standards Association (VESA), Peripheral Component Interface (PCI), or similar, for interconnecting all of the components of the processing circuitry 226. A description of the general features and functionality of the display 210, buttons 214, as well as the display controller 208, power management controller 220, network controller 206, and I/O interface 212 is omitted herein for brevity as these features are known.

An aspect is effective algorithms that provide improvements to Elliptic Curve (EC) cryptography systems in several ways, both in terms of computational speedup and resistance to side-channel attacks.

Figure 3A:
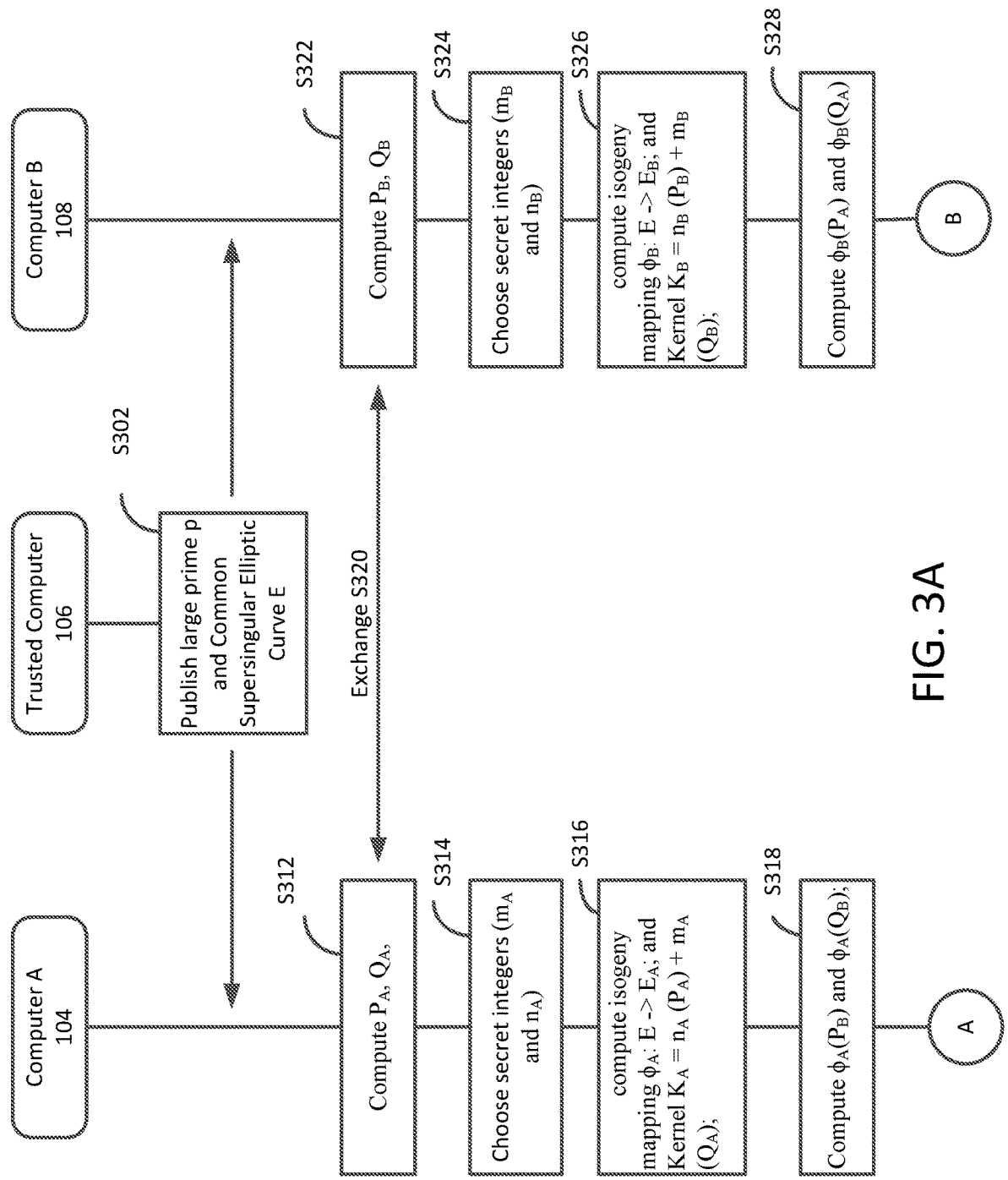
FIGS. 3A and 3B is a sequence diagram of Supersingular Isogeny Diffie-Hellman (SIDH) key exchange algorithm.
Figure 3B:
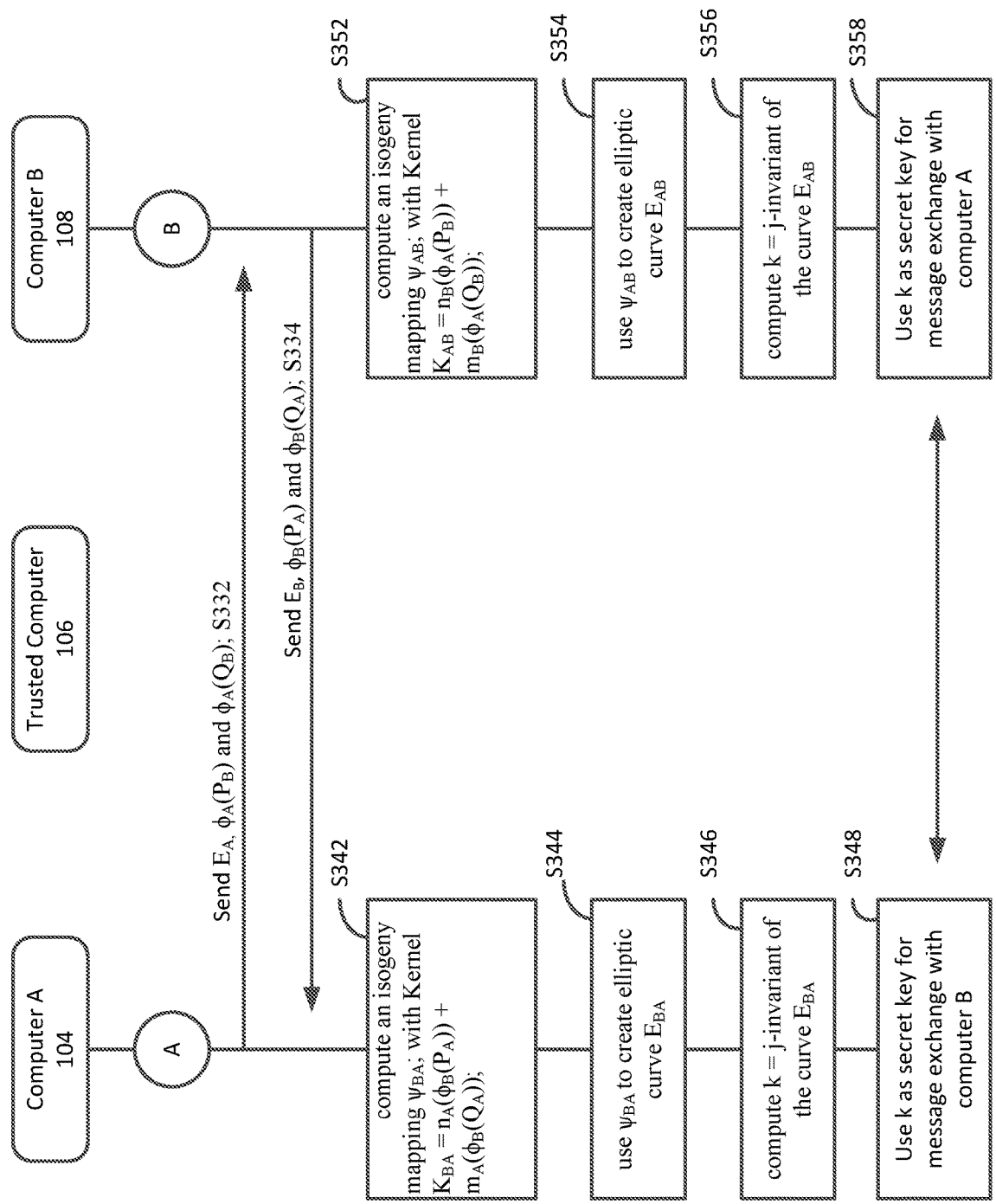

FIGS. 3A and 3B is a sequence diagram of Supersingular Isogeny Diffie-Hellman (SIDH) key exchange algorithm for secure communications between the first computer system 104 and the second computer system 108. The algorithm is such that the first computer system 104 and the second computer system 108 each compute a common secret key which is used for the secure communications. Both computer systems 104 and 108 start by being provided with a public supersingular elliptic curve and they both end up with the same isogenous curve to it, but by performing different computations on an isogeny graph.

Initially, in S302, a trusted computer system 106 may determine a prime p derived from two different small primes $l_A$, $l_B$, respective exponents, integers $e_A$, $e_B$, and a small cofactor f, and a public supersingular elliptic curve E having two subgroups $E[l_A^{e_A}]$ and $E[l_B^{e_B}]$. The prime p and public supersingular elliptic curve E may be transmitted to each of the first computer system 104 and the second computer system 108 over respective communication channels 114 and 118, via the Internet 102.

Each computer system 104 and 108 determines points, referred to as bases, on the public elliptic curve E and exchanges the computed points. In S312, first computer system 104 determines fixed elliptic points $P_A$, $Q_A$, of the subgroup $E[l_A^{e_A}]$, while in S322, second computer system 108 determines fixed elliptic points $P_B$, $Q_B$ of the subgroup $E[l_B^{e_B}]$.

In S314, first computer system 104 determines integers ($m_A$ and $n_A$), while in S324, second computer system 108 determines integers ($m_B$ and $n_B$).

In S316, first computer system 104 computes a kernel $K_A = m_A(P_A) + n_A(Q_A)$ and uses the point $K_A$ and the Velu's formulas to create isogeny mapping $\phi_A: E \rightarrow E_A$. In S326, second computer 108 computes a kernel $K_B = m_B(P_B) + n_B(Q_B)$ and uses the point $K_B$ and the Velu's formulas to create isogeny mapping $\phi_B: E \rightarrow E_B$.

In S318, first computer system 104 applies $\phi_A$ to $P_B$ and $Q_B$ to form two points on $E_A$: $\phi_A(P_B)$ and $\phi_A(Q_B)$. In S328, second computer 108 applies $\phi_B$ to $P_A$ and $Q_A$ to form two points on $E_B$: $\phi_B(P_A)$ and $\phi_B(Q_A)$.

First computer system 104 communicates with second computer system 108 to publically exchange values (which may be referred to as the key exchange phase). In a key exchange phase, the system uses the two points as the basis for a kernel of a new isogeny, and computes the coefficients of two new elliptic curves under two new isogenies.

In S332, first computer system 104 transmits $E_A$, $\phi_A(P_B)$ and $\phi_A(Q_B)$ to second computer system 108. In S334, second computer system 108 transmits $E_B$, $\phi_B(P_A)$ and $\phi_B(Q_A)$ to first computer system 104.

Each computer system then performs further private computations.

In S342, first computer system 104 uses $m_A$, $n_A$ $\phi_B(P_A)$ and $\phi_B(Q_A)$ to form $K_{BA} = m_A \phi_B(P_A)) + n_A(\phi_B(Q_A))$. The first computer system 104 uses $K_{BA}$ and Velu's formulas to create an isogeny mapping $\psi_{BA}$.

In a similar manner, in S352, second computer system 108 uses $m_B$, $n_B$ $\phi_A(P_B)$ and $\phi_A(Q_B)$ to form $K_{AB} = m_B(\phi_A(P_B)) + n_B(\phi_A(Q_B))$. The second computer system 108 uses $K_{AB}$ and Velu's formulas to create an isogeny mapping $\psi_{AB}$.

In S344, first computer system 104 uses $\psi_{BA}$ to create elliptic curve $E_{BA}$.

In a similar manner, in S354, second computer system 108 uses $\psi_{AB}$ to create elliptic curve $E_{AB}$.

In S346, first computer system 104 computes k=j-invariant of the curve $E_{BA}$.

In a similar manner, in S356, second computer system 108 computes k=j-invariant of the curve $E_{AB}$.

In S348 and S358, a message may be transmitted wherein a function of k is used as the common secret key.

Further enhancements to the Supersingular Isogeny Diffie-Hellman (SIDH) key exchange algorithm are provided to compute a kernel, in particular of the general form mP+nQ, where m and n are small integers, in a manner that optimizes implementation speed with the lowest cost among currently known algorithms using only one inversion.

An aspect is to efficiently compute the kernel by the first computer system 104 and the second computer system 108 by compensating the abscissa x and ordinate y equations of conventional EC systems in the higher doubling orders formulas and find a common factor between all slope's denominators in order to obtain a single inverse for each denominator. Unlike with other coordinates systems, the original affine operations with the Weierstrass elliptic curve form require computing an inverse each time point doubling or addition is performed, i.e., at every iteration of common fast EC scalar multiplication algorithms. See Washington. In general, finding inverses is much slower than big integer multiplication. Thus, as with Projective approaches, one goal is to eliminate inverses.

The most popular forms of public-key cryptography for current applications have increasingly been based on Elliptic Curves (ECs). See V. S. Miller, "Use of elliptic curves in cryptography," in Conference on the theory and application of cryptographic techniques. Springer, 1985, pp. 417-426; and N. Koblitz, "Elliptic curve cryptosystems," Mathematics of computation, vol. 48, no. 177, pp. 203-209,1987, each incorporated herein by reference in their entirety. With Elliptic Curve Cryptography (ECC), messages and secrets are mapped to points on an elliptic curve, which involves scalar point multiplication. However, computing a multiple of a point on an elliptic curve is of high cost. Scalar point multiplication may be performed more efficiently using a double-and-add algorithm. Point doubling and point addition operations define transitions between points. Scalar point multiplication can use such a sequence of point doubling and point addition operations to optimize repeated addition:

$$Q = [k]P = \underbrace{P + P + \ldots + P}_{k}.$$

The double-and-add algorithm includes steps of:
convert the scalar k into a binary expansion;
calculate the points representing the powers of two multiplies of the generator and just sum those which form the number in binary form (i.e., have ones at given positions of the binary expansion). In other words, P's are doubled in a loop, and only those doubled P's at 1's positions are added.

Cryptosystems based on ECs rely on the difficulty of solving the Elliptic Curve Discrete Log (ECDL) problem. Namely, for elliptic curves with points P of large order and large k numbers, given the points Q and P in the previous equation it is hard to determine the scalar multiple k. However, with the expected emergence of quantum computers, in the near future cryptosystems whose security relies on the difficulty of ECDL will no longer be safe, since the scalar multiple may be easily recovered using Shor's algorithm. See L. Chen, L. Chen, S. Jordan, Y.-K. Liu, D. Moody, R. Peralta, R. Perlner, and D. Smith-Tone, Report on post-quantum cryptography. US Department of Commerce, National Institute of Standards and Technology, 2016; and P. W. Shor, "Algorithms for quantum computation: Discrete logarithms and factoring," in Proceedings 35th annual symposium on foundations of computer science. Ieee, 1994, pp. 124-134, each incorporated herein by reference in their entirety. Other quantum resilient schemes have been proposed. Furthermore, post-quantum cryptosystems such as Supersingular Isogeny Diffie-Hellman (SIDH) are slow techniques, and speeding up its elliptic curve computation is frequently mentioned as a significant goal.

As mentioned in the background section, a core operation for ECC is the scalar multiplication [k]P whose computation speed is seen as key to improving ciphers. For instant, Eisenträger et al proposed a method for computing the formula $S=(2P+Q)$. See K. Eisenträger, K. Lauter, and P. L. Montgomery, "Fast elliptic curve arithmetic and improved weil pairing evaluation," in Cryptographers' Track at the RSA Conference. Springer, 2003, pp. 343-354, incorporated herein by reference in its entirety. Their improved procedure saves a field multiplication, when compared to the original algorithm. Later, Ciet et al introduced a faster method for computing the same formula when a field inversion costs more than six field multiplications. See M. Ciet, M. Joye, K. Lauter, and P. L. Montgomery, "Trading inversions for multiplications in elliptic curve cryptography," Designs, codes and cryptography, vol. 39, no. 2, pp. 189-206,2006, incorporated herein by reference in its entirety. Furthermore, they introduced an efficient method for computing point tripling. Mixed powers system of point doubling and tripling for computing the scalar multiplication was represented later by Dimitrov et al. See V. Dimitrov, L. Imbert, and P. K. Mishra, "Efficient and secure elliptic curve point multiplication using double-base chains," in International Conference on the Theory and Application of Cryptology and Information Security. Springer, 2005, pp. 59-78, incorporated herein by reference in its entirety. Mishra et al. presented an efficient quintuple formula (5P) and introduced a mixed base algorithm with doubling and tripling. See P. K. Mishra and V. Dimitrov, "Efficient quintuple formulas for elliptic curves and efficient scalar multiplication using multibase number representation," in International Conference on Information Security. Springer, 2007, pp. 390-406, incorporated herein by reference in its entirety. Further development was introduced by Longa and Miri by computing an efficient method for tripling and quintupling mixed with differential addition. See P. Longa and A. Miri, "New multibase non-adjacent form scalar multiplication and its application to elliptic curve cryptosystems (extended version)." IACR Cryptology ePrint Archive, vol. 2008, p. 52, 2008, incorporated herein by reference in its entirety. They proposed an efficient multibases nonadjacent representation (mbNAF) to reduce the cost. In Longa and Miri the same authors present further optimization in terms of cost for computing the form dP+Q. They have succeeded in implementing the previous forms of mixed double and add algorithm by using a single inversion when applying a new precomputation scheme. More recently, Purohit and Rawat used a multibase representation to propose an efficient scalar multiplication algorithm of doubling, tripling, and septupling, restricted on a non super-singular elliptic curve defined over the field $F_2m$. See G. Purohit and A. S. Rawat, "Fast scalar multiplication in ecc using the multi base number system," International Journal of Computer Science Issues (IJCSI), vol. 8, no. 1, p. 131, 2011, incorporated herein by reference in its entirety. In addition, they have compared their work with other existing algorithms to achieve better representation in terms of cost. Therefore, speeding up the scalar multiplication computation in parallel with reducing the cost is a critical task.

Among all applications based on EC, Supersingular Isogeny Diffie-Helman (SIDH). provides a promising approach as a post-quantum cryptosystem Its main weakness is the slow elliptic curve computation speed. For elliptic curve schemes, the computation speed-up also favors attacks, which can however be compensated by increasing the size of the key. Isogeny-based cryptography also utilizes points on an elliptic curve, but its security is instead based on the difficulty of computing isogenies between elliptic curves. An isogeny can be thought of as a unique algebraic mapping between two elliptic curves that satisfy the group law. An algorithm for computing isogenies on ordinary curves in sub-exponential time was presented by Childs et al., rendering the use of cryptosystems based on isogenies on ordinary curves unsafe in the presence of quantum computers. See A. Childs, D. Jao, and V. Soukharev, "Constructing elliptic curve isogenies in quantum subexponential time," Journal of Mathematical Cryptology, vol. 8, no. 1, pp. 1-29, 2014, incorporated herein by reference in its entirety. However, there is no known algorithm for computing isogenies on supersingular curves in sub-exponential time.

Figure 4:
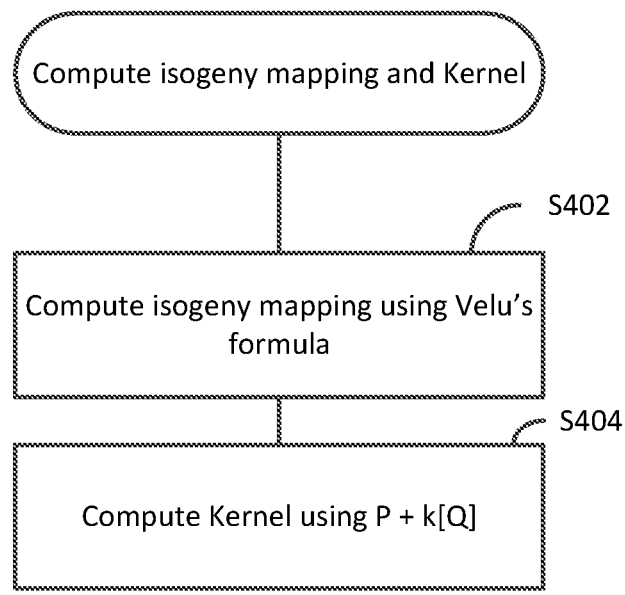
FIG. 4 is a flowchart of a method of computing isogeny mapping and kernel in the SIDH algorithm of FIGS. 3A and 3B.
Figure 5:
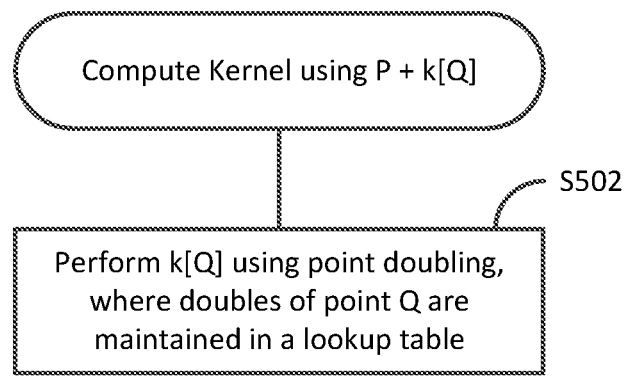
FIG. 5 is a flowchart of a method of computing the kernel of FIG. 4 including a lookup table in accordance with an exemplary aspect of the disclosure.

FIG. 4 is a flowchart of a method of computing isogeny mapping and kernel in the SIDH algorithm of FIGS. 3A and 3B (S316, S326, S342, S352). The core operations for SIDH includes, step S402, computing the isogeny using Velu's formula, and, step S404, computing its kernel using the P+k[Q] formula, where P and Q are points on the curve and k is the secret key (see Jao et al.). This operation must be performed in both phases of SIDH. First, this happens in the key generation phase (S316, S326), where the point is known in advance. FIG. 5 is a flowchart of a method of computing the kernel of FIG. 4 (S404) including a lookup table in accordance with an exemplary aspect of the disclosure. In S502, a lookup table stored in a memory of the first computer system 104 and of the second computer system 108 may be constructed that contains all doubles of point Q. The doubles can be reused when needed without having to compute the double. Second, in the key exchange phase (S342, S352), where the point Q is variable, a mixed-base representation (up to 32) may be applied in order to further speed up the calculations, given that all mixed-base formulas are implemented with a single inversion.

According to Gutub, there are various ways to apply elliptic curves in applications of cryptography. See A. Gutub, "Efficient utilization of scalable multipliers in parallel to compute gf (p) elliptic curve cryptographic operations," Kuwait Journal of Science & Engineering (KJSE), December 2007, vol. 34, no. 2, pp. 165-182, 2007, incorporated herein by reference in its entirety. Getub noted how the algorithm utilized for calculating nP from P is based on the binary representation of n. This is because this is the efficient and practical way to implement in hardware systems. That is, the binary algorithm scans the bits of n and doubles the point Q k-times. Gutub further explained that an extra operation of point addition (Q+P) is essential and needed to perform in every case that a particular bit of n is found.

a) Weierstrass Elliptic Curve: This section represents the equations of the original work that the present algorithm is compared with. Elliptic curves over $\mathbb{Z}_p$, where p>3 are considered. Such a curve, in the short Weierstrass form in the affine plan, is the set of all pairs $(x,y)\epsilon\mathbb{Z}_p$ which fulfill:

$$y^2 \equiv x^3 + ax + b (\bmod p) \quad (1)$$

For $P=(x_P, y_P)$ and $Q=(x_Q, y_Q)$, one can compute P+Q by using the following equations, where the computation of $\lambda$ differs based on two disjoint cases. See C. Paar and J. Pelzl, Understanding cryptography: a textbook for students and practitioners. Springer Science & Business Media, 2009, incorporated herein by reference in its entirety.

In case of addition where P≠Q:

$$\lambda = \left(\frac{y_Q - y_P}{x_Q - x_P}\right) \bmod p \quad (2)$$

$$x_R = \lambda^2 - x_P - x_Q \bmod p$$

In case of computing 2*P (doubling of order one) where P has coordinates $(x_1, y_1)$:

$$\lambda = \left(\frac{3x_1^2 + a}{2y_1}\right) \bmod p \quad (3)$$

$$x_2 = \lambda^2 - 2x_1 \bmod p \quad (4)$$

$$y_2 = \lambda(x_1 - x_2) - y_1 \bmod p \quad (5)$$

Where $\lambda$ is the slope of the tangent through P, and $x_2$ and $y_2$, the affine coordinates after doubling P one time. While a two dimensional projective space can also be used for computations in Weierstrass form, here the focus is on computations in the affine plan.

b) Projective: Projective coordinates is another way of representing an elliptic curve. The elliptic curve F can be described by another equation, in the projective space $P^2$. That is, the polynomial defines a curve in the projective space $P^2$ which is also known as a Weierstrass equation:

$$\Gamma: Y^2Z + a_1XYZ + a_3YZ^2 = X^3 + a_2X^2Z + a_4XZ^2 + a_6Z^3$$

See N. P. Smart, Cryptography made simple. Springer, 2016, vol. 481, incorporated herein by reference in its entirety.

According to Smart, a definition of a projective n-dimensional space $P^2$ over a field F is:
the set of (n+1)—tuples $(x_0, \ldots, x_n) \epsilon F^{n+1}$
where at least one $x_i$ per tuple does not equal 0, and;
where an equivalence relation between two tuples $(x_{0,1}, \ldots, x_{n,1})$ and $(x_{0,2}, \ldots, x_{n,2})$ in $P^n$=holds if
$\exists U \epsilon F$ such that $\forall i, x_{i,1} = U x_{i,2}$ It is noted that a more general definition would replace the $3^{rd}$ condition with: $\forall i, x_{i,1} = g_i(U) x_{i,2}$ for some bijective function $g_i$.

The equivalence class of $\{U(x_0, \ldots, x_n, U \epsilon F\}$ is denoted by $[x_0, \ldots, x_n]$, where these $x_0, \ldots, x_n$ are known as the homogeneous coordinates of that point (see Smart). Projective coordinates are useful in cases where there is a need to eradicate the performance of costly inversion operations (see Gutub).

Higuchi and Takagi and Okeya et al. noted how randomized projective coordinates on a Montgomery-form elliptic curve are effective in securing systems against side channel attacks. See A. Higuchi and N. Takagi, "A fast addition algorithm for elliptic curve arithmetic in gf (2n) using projective coordinates," Information processing letters, vol. 76, no. 3, pp. 101-103,2000; and K. Okeya, K. Miyazaki, and K. Sakurai, "A fast scalar multiplication method with randomized projective coordinates on a montgomery-form elliptic curve secure against side channel attacks," in International Conference on Information Security and Cryptology. Springer, 2001, pp. 428-439, each incorporated herein by reference in their entirety. For example, Okeya et al. recommended a scalar multiplication method that does not incur a higher computational cost for randomized projective coordinates of the Montgomery form of elliptic curves.

Homogeneous projective coordinates correspond to the 2-dimensional space through the substitution x=X/Z and y=Y/Z, so that the general Weierstrass form equates to:

$$E: Y^2Z + a_1XYZ + a_3YZ^2 = X^3 + a_2X^2Z + a_4XZ^2 + a_6Z^3.$$

Jacobian projective coordinates are obtained by substituting $x=X/Z^2$ and $y=Y/Z^2$, so that the general Weierstrass form equates to:

$$E: Y^2 + a_1XYZ + a_3YZ^3 = X^3 + a_2X^2Z^2 + a_4XZ^4 + a_6Z^3.$$

See M. Eichler and D. Zagier, The theory of Jacobi forms. Springer, 1985, vol. 55; P.-Y. Liardet and N. P. Smart, "Preventing spa/dpa in ecc systems using the jacobi form," in International Workshop on Cryptographic Hardware and Embedded Systems. Springer, 2001, pp. 391-401; and O. Billet and M. Joye, "The jacobi model of an elliptic curve and side-channel analysis," in International Symposium on Applied Algebra, Algebraic Algorithms, and Error-Correcting Codes. Springer, 2003, pp. 34-42, each incorporated herein by reference in their entirety.

With the use of a projective coordinates approach, the attacker is unable to predict the appearance of a specific value when the projective coordinates are randomized (see Okeya et al.; Higuchi et al.).

Specifically, Higuchi and Takagi proposed a fast addition algorithm on an elliptic curve over GF(2") using projective coordinates:

$$x=X/Z \; y=Y/Z^2$$

According to Higuchi and Takagi, the above projective coordinates have less multiplications than the previously known fastest algorithm. See J. Lopez and R. Dahab, "Improved algorithms for elliptic curve arithmetic in gf (2 n)," in International Workshop on Selected Areas in Cryptography. Springer, 1998, pp. 201-212, incorporated herein by reference in its entirety.

An aspect is to apply a term re-grouping step (referred to as labeling) to minimize the number of multiplications. By using these methods, higher orders doubling can be computed in an efficient way with an algorithm involving a single inverse.

Affine Re-Computation of Multi-Stage Doubling

When computing scalar multiplication of elliptic curve points P using fast algorithms inspired from Horner's rule, it is common to include operations of the type kP, that are referred here as the $k^{th}$ order double of P. For large numbers, it may be necessary to compute doubles, and in particular high order doubles. Certain high order doubles may be directly computed without performing all steps.

Figures 6, 7:
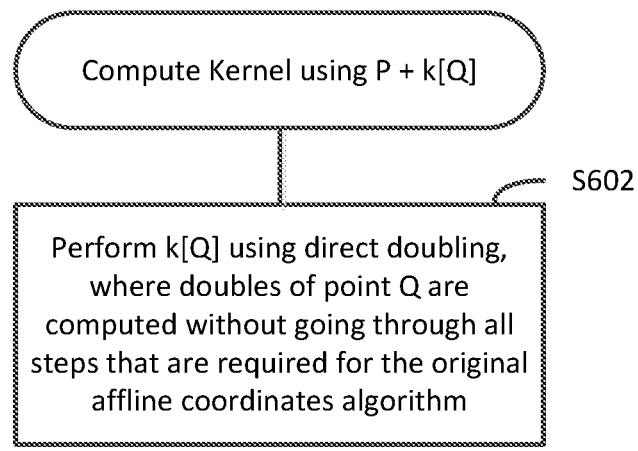
FIG. 6 is a flowchart of a further method of computing the kernel of FIG. 4 using direct doubling in accordance with an exemplary aspect of the disclosure.
FIG. 7 is a flowchart of a further method of computing the kernel of FIG. 4 using direct doubling with a single inverse in accordance with an exemplary aspect of the disclosure.

FIG. 6 is a flowchart of a further method of computing the kernel of FIG. 4 (S404) using direct doubling in accordance with an exemplary aspect of the disclosure. In S602, higher order doubling is performed independently by the first computer system 104 and the second computer system 108 without going throw all steps that are required for the original affine coordinates algorithm.

$2^k$P is referred to as the k'h double of P, and to kP as the $k^{th}$ order double of P. $N_{xk}$ and $N_{yk}$ denote the numerators of the x and y coordinates of the eh order double (kP), which are denoted $x_k$ and $y_k$ respectively. Namely, rewrite $$x_k = \frac{N_{xk}}{U_k^2}$$

and $$y_k = \frac{N_{yk}}{U_k^3},$$

where k is the order of the desired double, and $U_k$ denotes the corresponding added projective parameter.

In order to compute 4P, first find $N_{x2}$ and $N_{y2}$ where they are the numerators of $x_2$ and $y_2$, the x and y coordinates of the first double (2P) respectively.

For this, substitute the value of λ in Equation (3) in both equations of x and y coordinates, then multiply the transformed Equations (4) and (5) with $(2_{y1})^2$, for denominators with $U_2=2_{y1}$. The obtained $N_{x2}$ and $N_{y2}$ expressions are, $$N_{x2}=(3x_1^2+a)^2-2x_1(2y_1)^2 \bmod p \qquad (6)$$

$$N_{y2}=(3x_1^2+a)(x_1(2y_1)^2-N_{x2})-2y_1^2(2y_1)^2 \bmod p \qquad (7)$$

Replace the variables $x_2$ and $y_z$ in the second double slope, getting:

$$\lambda_4 = \frac{3x_2^2+a}{2y_2} \bmod p$$

$$\lambda_4 = \frac{3\left(\frac{N_{x2}}{U_2^2}\right)^2+a}{2\frac{N_{y2}}{U_2^3}} \bmod p$$

Note that $U_2$ is the denominator of the (2P) slope $\lambda_2=\lambda$. Now, eliminate the inverses by amplifying the fraction of $\lambda_4$ with $$\frac{U_2^4}{U_2^4},$$

$$\lambda_4 = \frac{3N_{x2}^2+aU_2^4}{2N_{y2}U_2} \bmod p \qquad (8)$$

For simplicity, consider, $$W_4=3N_{x2}^2+aU_2^4 \bmod p \qquad (9)$$

$$q_4=2N_{y2} \bmod p$$

The new denominator of the obtained slope $\lambda_4$ is:

$$U_4=q_4U_2 \bmod p \qquad (10)$$

Then substitute the new slope equation in the $x_4$ and $y_4$ equations, $$x_4=\lambda_4^2-2x_2 \bmod p$$

$$x_4 = \left(\frac{W_4}{U_4}\right)^2 - 2\frac{N_{x2}}{U_2^2} \bmod p$$

Eliminating the inverses in $x_4$ equation by bringing to common denominator and amplifying the obtained fraction with the value of $U_4^2$ where from Equation 10, $$U_4=(2y_1)q_4$$

get, $$U_4^2 x_4 = W_4^2 - 2N_{x2}q_4^2 \bmod p \qquad (11)$$

$$x_4 = \frac{W_4^2 - 2N_{x2}q_4^2}{U_4^2} \bmod p$$

Where to match, $$x_4 = \frac{N_{x4}}{U_4^2} \bmod p \qquad (12)$$

obtain:

$$N_{x4}=W_4^2-2N_{x2}q_4^2$$

Same steps will be applied in order to find and simplify $y_4$ $$y_4=\lambda_4(x_2-x_4)-y_2 \bmod p$$

$$y_4 = \frac{W_4}{U_4}\left(\frac{N_{x2}}{U_2^2} - \frac{N_{x4}}{U_4^2}\right) - \frac{N_{y2}}{U_2^3} \bmod p$$

Then amplify $y_4$ by $U_4^3$ $$U_4^3 y_4 = W_4(N_{x2}q_4^2 - N_{x4}) - N_{y2}q_4^3 \bmod p \qquad (13)$$

$$y_4 = \frac{W_4(N_{x2}q_4^2 - N_{x4}) - N_{y2}q_4^3}{U_4^3} \bmod p$$

where to match $$y_4 = \frac{N_{y4}}{U_4^3} \bmod p \qquad (14)$$

obtain $$N_{y4}=W_4(N_{x2}q_4{}^2-N_{x4})-N_{y2}q_4{}^3$$

Furthermore, the equations for higher order double can be generalized for any doubling order. By using this form, in S602, compute $N_{xn}$ and $N_{yn}$ and then replace all the variables in the equation that are related to the order of the desired double in order to perform any advance double directly (Direct Doubling). Computing the previous $W_n$'s, $U_n$'s, N's and $N_{yn}$'s is required but with having $N_{xn}$ and $N_{yn}$ formulas, the computations can be done smoothly.

Here is the general form that performs any double:

$$W_n = 3N_{x_{n/2}}^2 + aU_{n/2}^4 \mod p \tag{15}$$

$$q_n = 2N_{y_{n/2}} \mod p$$

$$U_n = q_n U_{n/2} \mod p \tag{16}$$

$$x_n = \frac{W_n^2 - 2N_{x_{n/2}} q_n^2}{U_n^2} \mod p \tag{17}$$

$$x_n = \frac{N_{x_n}}{U_n^2} \mod p \tag{18}$$

$$N_{x_n} = W_n^2 - 2N_{x_{n/2}} q_n^2 \tag{19}$$

$$y_n = \frac{W_n(N_{x_{n/2}} q_n^2 - N_{x_n}) - N_{y_{n/2}} q_n^3}{U_n^3} \mod p \tag{20}$$

$$y_n = \frac{N_{y_n}}{U_n^3} \mod p \tag{21}$$

$$N_{yn}=W_n(N_{xn/2}q_n{}^2-N_{xn})-N_{yn/2}q_n{}^3 \tag{22}$$

Where n is the order of the double and n/2 assigned to the previous power of 2 double.

a) Numerical Examples: In this section, the cyclic group of points on the elliptic curve E in FIG. 7 is used, where the order of E is 19 (see Paar et al.):

$$E: y^2 \equiv x^3+2x+2 \mod 17 \tag{23}$$

As seen in FIG. 7, it starts from the primitive element P=(5,1) to 19P that represents the identity element, then flips to P again as it is the characteristic of any cyclic group. This curve is used in all numerical example sections at the end of each algorithm.

Let P=(5,1) to exemplify Direct Doubling algorithm of S602. First, compute $N_{x1}$ and $N_{y1}$ that are related to the point 2P=(6,3), then apply another four iterations in order to compute the point 32P mod 17 that is equivalent to the point 13P=(16,4).

$$N_{x2}=(3x_1{}^2+a)^2-2x_1(2y_1)^2 \mod p$$

$$N_{x2}=(3(5)^2+2)^2-2(5)(2(1))^2 \mod 17$$

$$N_{x2}=13-6 \mod 17$$

$$N_{x2}=7$$

$$N_{y2}=(3x_1{}^2+a)(x_1(2y_1)^2-N_{x2})-2y_1{}^2(2y_1)^2 \mod p$$

$$N_{y2}=(3(5)^2+2)((5)(2(1))^2-7)-2(1)^2(2(1))^2 \mod 17$$

$$N_{y2}=9(3-7)-8 \mod 17$$

$$N_{y2}=7$$

where $U_2=2_{y1}=2$.

Now start the first iteration to find the variables $N_{x4}$, $N_{y4}$, $W_4$, $q_4$ and $U_4$ that are related to the point 4P.

$$W_4=3N_{x2}{}^2+aU_2{}^4 \mod p$$

$$W_4=3(7)^2+2(2)^4 \mod 17$$

$$W_4=9$$

$$q_4=2N_{y2} \mod p$$

$$q_4=2(7) \mod 17$$

$$q_4=14$$

$$U_4=q_4U_2 \mod p$$

$$U_4=14(2) \mod 17$$

$$U_4=11$$

Then substitute these values in $x_4$ and $y_4$ equations, and get, $$x_4 = \frac{W_4^2 - 2N_{x_2} q_4^2}{U_4^2} \mod p$$

$$x_4 = \frac{9^2 - 2(7)(14)^2}{2} \mod 17$$

$$X_4=6/2 \mod 17$$

$$x_4=3$$

where the inverse of 2 is 9 and $N_{x4}=6$.

$$y_4 = \frac{W_4(N_{x_2} q_4^2 - N_{x_4}) - N_{y_2} q_4^3}{U_4^3} \mod p$$

$$y_4 = \frac{9(7(14)^2 - 6) - 7(14)^3}{11^3} \mod 17$$

$$y_4=5/5 \mod 17$$

$$y_4=1$$

wherein the inverse of 5 is 7 and $N_{y4}=5$.

Now the inputs for the next iteration are ready in order to compute the point 8P.

$$W_8=3N_{x4}{}^2+aU_4{}^4 \mod p$$

$$W_8=3(6)^2+2(11)^4 \mod 17$$

$$W_8=14$$

$$q_8=2N_{y4} \mod p$$

$$q_8=2(5) \mod 17$$

$$q_8=10$$

$$U_8=q_8U_4 \mod p$$

$$U_8=10(11) \mod 17$$

$$U_8=8$$

Then substitute these values in $x_8$ and $y_8$ equations, and get, $$x_8 = \frac{W_8^2 - 2N_{x_4}q_8^2}{U_8^2} \mod p$$

$$x_8 = \frac{14^2 - 2(6)(10)^2}{8^2} \mod 17$$

$x_8 = 16/13 \mod 17$ $x_8 = 13$ where the inverse of 13 is 4 and $N_{x8} = 16$.

$$y_8 = \frac{W_8(N_{x_4}q_8^2 - N_{x_8}) - N_{y_4}q_8^3}{U_8^3} \mod p$$

$$y_8 = \frac{14(6(10)^2 - 16) - 5(10)^3}{8^3} \mod 17$$

$y_8 = 14/2 \mod 17$ $y_8 = 7$ where the inverse of 2 is 9 and $N_{y8} = 14$.

Now substitute with the new values of $N_x$, $N_y$ and U in the next iteration equations in order to compute the point 16P.

$W_{16} = 3N_{x8}^2 + aU_8^4 \mod p$ $W_{16} = 3(16)^2 + 2(8)^4 \mod 17$ $W_{16} = 1$ $q_{16} = 2N_{yx} \mod p$ $q_{16} = 2(14) \mod 17$ $q_{16} = 11$ $U_{16} = q_{16}U_8 \mod p$ $U_{16} = 11(8) \mod 17$ $U_{16} = 3$ Then substitute these values in $x_{16}$ and $y_{16}$ equations, and get, $$x_{16} = \frac{W_{16}^2 - 2N_{x8}q_{16}^2}{U_{16}^2} \mod p$$

$$x_{16} = \frac{1^2 - 2(16)(11)^2}{3^2} \mod 17$$

$X_{16} = 5/9 \mod 17$ $x_{16} = 10$

The inverse of 9 is 2 and $N_{x16} = 5$.

$$y_{16} = \frac{W_{16}(N_{x8}q_{16}^2 - N_{x16}) - N_{y8}q_{16}^3}{U_{16}^3} \mod p$$

$$y_{16} = \frac{1(16(11)^2 - 5) - 14(11)^3}{3^3} \mod 17$$

$y_{16} = 8/10 \mod 17$ $y_{16} = 11$

The inverse of 10 is 12 and $N_{y16} = 8$.

Now substitute with the new values of $N_x$, $N_y$ and U in the last iteration equations in order to compute the desired point 32P.

$W_{32} = 3N_{x16}^2 + aU_{16}^4 \mod p$ $W_{32} = 3(5)^2 + 2(3) \mod 17$ $W_{32} = 16$ $q_{32} = 2N_{y16} \mod p$ $q_{32} = 2(8) \mod 17$ $q_{32} = 16$ $U_{32} = q_{32}U_{16} \mod p$ $U_{32} = 16(3) \mod 17$ $U_{32} = 14$ Then substitute these values in $x_{32}$ and $y_{32}$ equations, and get, $$x_{32} = \frac{W_{32}^2 - 2N_{x16}q_{32}^2}{U_{32}^2} \mod p$$

$$x_{32} = \frac{(16)^2 - 2(5)(16)^2}{(14)^2} \mod 17$$

$x_{32} = 8/9 \mod 17$ $x_{32} = 16$ where the inverse of 9 is 2 and $N_{x32} = 8$. Further, $$y_{32} = \frac{W_{32}(N_{x16}q_{32}^2 - N_{x32}) - N_{y16}q_{32}^3}{U_{32}^3} \mod p$$

$$y_{32} = \frac{16(5(16)^2 - 8) - 8(16)^3}{(14)^3} \mod 17$$

$y_{32} = 11/7 \mod 17$ $y_{32} = 4$ where the inverse of 7 is 5 and $N_{y32} = 11$.

Intermediate Operations

As it is important to calculate the binary multiplicative $2^n$ for points Q to compute a large degree isogeny, the algorithm may be enhanced by determining the intermediate steps like 3P, 5P, and 7P etc.

Subramanya Rao have worked on Montgomery curves and found an efficient technique to find point tripling. See S. R. S. Rao, "Three dimensional montgomery ladder, differential point tripling on montgomery curves and point quintupling on weierstrass' and edwards curves," in International Conference on Cryptology in Africa. Springer, 2016, pp.

84-106, incorporated herein by reference in its entirety. Simply, the present algorithm optimizes an application of a single double to some point P then performs a point addition. This technique could be applied to all intermediate steps. A set of general forms are presented through which represent the interstitial points up to 31P.

A. Fast $2^nQ+P$

Figure 8:
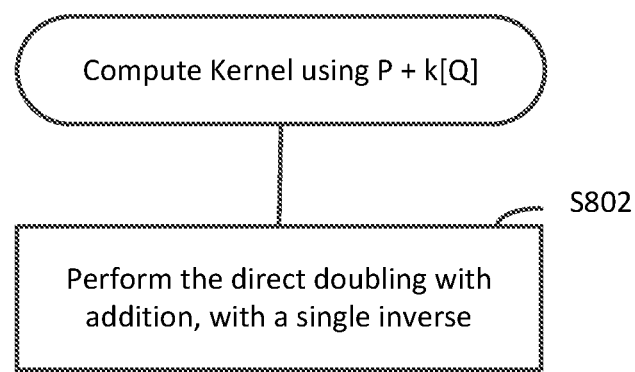
FIG. 8 illustrates a cyclic group of the elliptic curve E: $y^2 \equiv x^3+2.x+2$ mod 17.

As mentioned earlier in the background section, the complexity of the SIDH cryptosystem relies on the efficiency of computing isogenies between points on the elliptic curve. Thus, a further optimization may be accomplished by reducing the number of computations in performing the kernel Equation P+[k]Q. FIG. 8 is a flowchart of a further method of computing the kernel of FIG. 4 (S404) using direct doubling with a single inverse in accordance with an exemplary aspect of the disclosure. As an advanced exponent may be performed of a point on a curve with a single inverse, it would have been needed to compute an extra inverse for a differential point addition. Therefore, in this section a further optimization is introduced that includes mixing the advanced doubling equations with the addition and performs the addition with a single inverse.

The following equations have some variables like $N_x$, $N_y$, and U that are replaced with the variables related to each double.

The optimization includes substituting the value of x and y coordinates of the point $2^nP$ in Equations 18 and 21 respectively in the addition slope equation in 2.

$$\lambda_n = \frac{\frac{N_{y_n}}{U_n^3} - y_1}{\frac{N_{x_n}}{U_n^2} - x_1} \mod p$$

Multiplying with $U_n^3$, to eliminate the inverses, $$\lambda_{n+m} = \frac{N_{y_n} - y_1 U_n^3}{N_{x_n} U_n - X_1 U_n^3} \mod p \quad (24)$$

$$W_{n+m} = N_{y_n} - y_1 U_n^3 \mod p \quad (25)$$

$$q_{n+m} = N_{x_n} - x_1 U_n^2 \mod p \quad (26)$$

$$U_{n+m} = U_n q_{n+m} \mod p \quad (27)$$

Substitute $\lambda_{n+m}$, in the equations for $x_{n+m}$ and $y_{n+m}$, $$x_{n+m} = \left(\frac{W_{n+m}}{U_{n+m}}\right)^2 - x_1 - \frac{N_{x_n}}{U_n^2} \mod p$$

Multiplying with $U_{n+m}^2$, $$x_{n+m} = \frac{W_{n+m}^2 - x_1 U_{n+m}^2 - N_{x_n} q_{n+m}^2}{U_{n+m}^2} \mod p \quad (28)$$

$$x_{n+m} = \frac{N_{x_{n+m}}}{U_{n+m}^2} \mod p$$

Now find $y_{n+m}$, $$y_{n+m} = \frac{W_{n+m}}{U_{n+m}}\left(x_1 - \frac{N_{x_{n+m}}}{U_{n+m}^2}\right) - y_1 \mod p$$

Multiplying with $U_{n+m}^3$, $$y_{n+m} = \frac{W_{n+m}(x_1 U_{n+m}^2 - N_{x_{n+m}})y_1 U_{n+m}^3}{U_{n+m}^3} \mod p \quad (29)$$

$$y_{n+m} = \frac{N_{y_{n+m}}}{U_{n+m}^3} \mod p$$

a) Numerical Examples: Let P=(5,1), then apply the $2^nP+P$ algorithm to compute the new x and y coordinates. In this example $2^2P+P$ may be applied in order to find the point 5P. Consider the values previously computed in the numerical example of affine re-computation of multi-stage doubling for the point 4P where, $N_{x4}=6$ $N_{y4}=5$ $U_4=11$ Substitute these values in the Equations 28 and 29 then get, $W_5=N_{y4}-y_1 U_4^3 \mod p$ $W_5=5-1(11)^3 \mod 17$ $W_5=0$ $q_5=N_{x4}-x_1 U_4^2 \mod p$ $q_5=6-5(11)^2 \mod 17$ $q_5=13$ $U_5=U_4 q_5 \mod p$ $U_5=11(13) \mod 17$ $U_5=7$ $$x_5 = \frac{W_5^2 - x_1 U_5^2 - N_{x4} q_5^2}{U_5^2} \mod p$$

$$x_5 = \frac{(0)^2 - 5(7)^2 - 6(13)^2}{(7)^2} \mod 17$$

$x_5=16/15 \mod 17$ $x_5=9$

Where the inverse of 15 is 8 and $N_{x5}=16$.

$$y_5 = \frac{W_5(x_1 U_5^2 - N_{x_5}) - y_1 U_5^2}{U_5^3} \mod p$$

$$y_5 = \frac{0(5(7)^2 - 16) - 1(7)^3}{(7)^3} \mod p$$

$y_5=14/3 \mod 17$ $y_5=16$

Where the inverse of 3 is 6 and $N_{y5}=14$.

Figure 9:
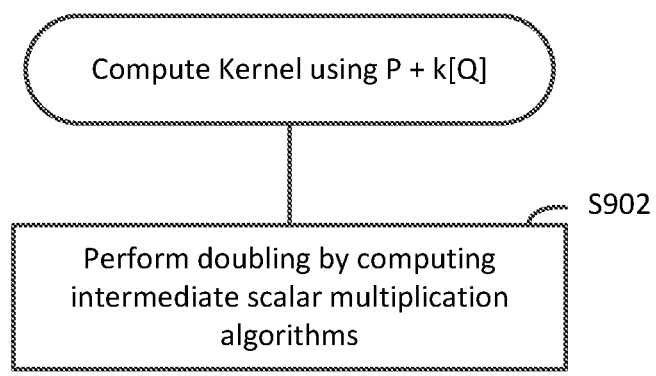
FIG. 9 is a flowchart of a further method of computing the kernel of FIG. 4 using intermediate scalar multiplication algorithms in accordance with an exemplary aspect of the disclosure.

B. Other General Forms FIG. 9 is a flowchart of a further method of computing the kernel of FIG. 4 (S404) using intermediate scalar multiplication algorithms in accordance with an exemplary aspect of the disclosure. The same steps as in S602 may be followed in S902 to find intermediate scalar multiplication algorithms, multiplying an EC point P with scalars up to 31P. The above description of intermediate operations illustrate the importance of computing the intermediate equations for the overall speed-up of the present algorithms. Table I lists the general forms illustrated to implement all the points up to 31P.

TABLE I

INTERMEDIATE ALGORITHMS GENERAL FORMS.

| Forms | Algorithms |
|---|---|
| $2^n P + P$ | $W_{n+m} = N_{y_n} - y_1 U_n^3$ <br> $q_{n+m} = N_{x_n} - x_1 U_n^2$ <br> $U_{n+m} = U_n q_{n+m}$ <br><br> $x_{n+m} = \dfrac{W_{n+m}^2 - x_1 U_{n+m}^2 - N_{x_n} q_{n+m}^2}{U_{n+m}^2}$ <br><br> $y_{n+m} = \dfrac{W_{n+m}(x_1 U_{n+m}^2 - N_{x_{n+m}}) - y_1 U_{n+m}^3}{U_{n+m}^3}$ |
| $2^n P + 2P$ | $W_{n+m} = N_{y_n} - 8 N_{y_m}^4$ <br> $q_{n+m} = N_{x_n} - 4 N_{x_m} N_{y_m}^2$ <br> $U_{n+m} = U_n q_{n+m}$ <br><br> $x_{n+m} = \dfrac{W_{n+m}^2 - 4 N_{x_m} N_{y_m}^2 q_{n+m}^2 - N_{x_n} q_{n+m}^2}{U_{n+m}^2}$ <br><br> $y_{n+m} = \dfrac{W_{n+m}(4 N_{x_m} N_{y_m}^2 q_{n+m}^2 - N_{x_{n+m}}) - 8 N_{y_m}^4 q_{n+m}^3}{U_{n+m}^3}$ |
| $2(nP)$ | $W_{2n} = 3 N_{x_n}^2 + a U_n^4$ <br> $q_{2n} = 2 N_{y_n}$ <br> $U_{2n} = U_n q_{2n}$ <br><br> $x_{2n} = \dfrac{W_{2n}^2 - 2 N_{x_n} q_{2n}^2}{U_{2n}^2}$ <br><br> $y_{2n} = \dfrac{W_{2n}(N_{x_n} q_{2n}^2 - N_{x_{2n}}) - N_{y_n} q_{2n}^3}{U_{2n}^3}$ |
| $2(nP) + P$ | $W_{2n+1} = N_{y_{2n}} - y_1 U_{2n}^3$ <br> $q_{2n+1} = N_{x_{2n}} - x_1 U_{2n}^2$ <br> $U_{2n+1} = U_{2n} q_{2n+1}$ <br><br> $x_{2n+1} = \dfrac{W_{2n+1}^2 - x_1 U_{2n+1}^2 - N_{x_{2n}} q_{2n+1}^2}{U_{2n+1}^2}$ <br><br> $y_{2n+1} = \dfrac{W_{2n+1}(x_1 U_{2n+1}^2 - N_{x_{2n+1}}) - y_1 U_{2n+1}^3}{U_{2n+1}^3}$ |

As it is known, the non-adjacent form (NAF) aims to reduce the number of one bit in the binary representation and thus reduce the number of operations, here in Table II the mathematical structure is relied on in representing all points up to 31P with the fastest and most efficient possible form.

TABLE II

STRUCTURE AND COST FOR ALL INTERMEDIATE ALGORITHMS.

| Algorithms | Structure | Number of Multiplications |
|---|---|---|
| 3P | 2P + P | 19 |
| 5P | 4P + P | 28 |
| 6P | 4P + 2P | 26 |
| 7P/9p | 8P ± P | 38 |
| 10P | 2(5P) | 38 |
| 11P | 2(5P) + P | 51 |
| 12P | 2(6P) | 36 |
| 13P | 2(6P) + P | 49 |
| 14P/18P | 2(7/9P) | 48 |
| 15P/17P | 16P ± P | 48 |
| 19P | 2(9P) + P | 61 |
| 20P | 2(10P) | 46 |
| 21P | 2(10P) + P | 61 |
| 22P | 2(11P) | 62 |
| 23P/25P | 2(12P) ± P | 59 |
| 24P | 2(12P) | 46 |
| 26P | 2(13P) | 59 |
| 27P | 2(14P) − P | 71 |
| 28P | 2(14P) | 58 |
| 29P | 2(15P) − P | 71 |
| 30P | 2(15P) | 58 |
| 31P | 32P − P | 58 |

Extraction of Coordinates (EISI Coordinates) Coordinate System

Figure 10:
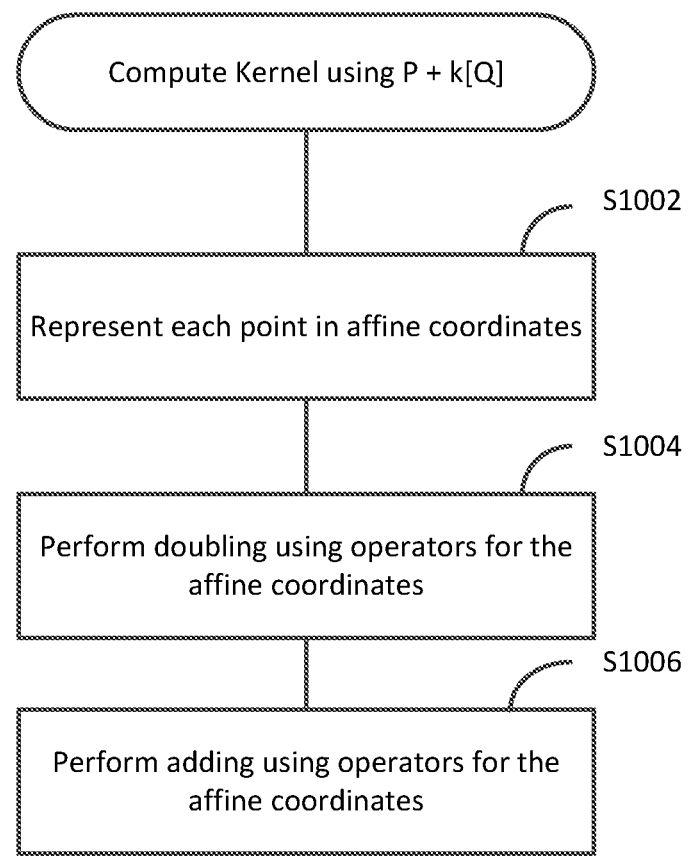
FIG. 10 is a flowchart of a further method of computing the kernal of FIG. 4 using extraction of coordinates in accordance with an exemplary aspect of the disclosure.

An aspect is a coordinate system that uses only x and y coordinates and performs a single inverse along the secret key size. FIG. 10 is a flowchart of a further method of computing the kernal of FIG. 4 (S404) using extraction of coordinates in accordance with an exemplary aspect of the disclosure. The EiSi coordinate system has competitive properties when compared with other coordinate systems. The EiSi coordinate system also provides a set of new and efficient operators in the Jacobian coordinate space. Different competing general scalar EC multiplication algorithms are introduced and used to compare between the scalar multiplication algorithms using multiple coordinate systems in order to illustrate the strengths of the EiSi coordinate system.

The EiSi coordinate system can be seen as a modified version of either the affine or Jacobian spaces with different operators. Also, the EiSi space operators offer faster arithmetic. Similarly to Projective techniques, this form of elliptic curve is represented with a single inversion at the last iteration. In S1002, each point $P_A = (N_{xA}: N_{yA}: U_A)$ is represented in affine coordinates as $(N_{xA}/U_A^2, N_{yA}/U_A^3)$.

Let $P_A$ and $P_B$ be points on an elliptic curve then, in affine space, $$(X_A:Y_A)+(X_B:Y_B)=(X_C:Y_C)$$

At the first iteration consider $U_A = U_B = 1$ to get, $$(N_{x_A}:N_{y_A}) + (N_{x_B}:N_{y_B}) = \left(\frac{N_{x_C}}{U_C^2} : \frac{N_{y_C}}{U_C^3}\right)$$

Where, doubling S1004 is performed, $$N_{xC}=(3x_A^2+a)^2-2x_A(2y_A)^2 \bmod p \qquad (30)$$

$$N_{yC}=(3x_A^2+a)(x_A(2y_A)^2-N_{xA})-2y_A^2(2y_A)^2 \bmod p \qquad (31)$$

$$U_C=2y_A \bmod p \qquad (32)$$

Additionally, in S1006, two points are added after the first iteration, where the base point will be changed. A modified version of point addition algorithm is as follows. Let $P_A$ and $P_B$ be a point on the elliptic curve where $(N_{xA}: N_{yA}: U_A)$ and $(N_{xB}: N_{yB}: U_B)$ are the projective EiSi points representation respectively. Then, $$(N_{xA}:N_{yA}:U_A)+(N_{xB}:N_{yB}:U_B)=N_{xC}:N_{yC}:U_C$$

In case $P_1 \neq \pm P_2$ (Addition), $$W_C = N_{yB}U_A^3 - N_{yA}U_B^3 \bmod p \quad (33)$$

$$q_C = N_{xB}U_A^2 - N_{xA}U_B^2 \bmod p \quad (34)$$

$$U_C = U_A U_B q_C \bmod p \quad (35)$$

$$N_{xC} = W_C^2 - N_{xA}U_B^2 q_C^2 - N_{xB}U_A^2 q_C^2 \bmod p \quad (36)$$

$$N_{yC} = W_C(N_{xA}U_B^2 q_C^2 - N_{xC}) - N_{yA}U_B^3 q_C^3 \bmod p \quad (37)$$

In case $P_A = P_B$ (Higher Order Doubling), let $P_1 = P_A$. Then, as proved in the description of affine re-computation of multi-stage doubling, recursively $$W_n = 3N_{xn/2}^2 + aU_{n/2}^4 \bmod p \quad (38)$$

$$q_n = 2N_{yn/2} \bmod p \quad (39)$$

$$U_n = q_n U_{n/2} \bmod p \quad (40)$$

$$N_{xn} = W_n^2 - 2N_{xn/2}q_n^2 \bmod p \quad (41)$$

$$N_{yn} = W_n(N_{xn/2}q_n^2 - N_{xn}) - N_{yn/2}q_n^3 \bmod p \quad (42)$$

Using the extraction of coordinates, the algorithms may be rewritten to receive $N_{xn}$, $N_{yn}$ and $U_n$ instead of $x_n$ and $y_n$ values. By applying this method, computing the inverse at each iteration may be dispensed with.

Since all algorithms start with finding $N_{x2}$ and $N_{y2}$ values that are related to the point 2P, some adjustments are made to these algorithms in terms of the inputs, then:

$$N_{x2} = (3N_{xin}^2 + aU_{in}^4)^2 - 8N_{xin}N_{yin}^2 \bmod p \quad (43)$$

$$N_{y2} = (3N_{xin}^2 + aU_{in}^4)(4N_{xin}N_{yin}^2 - N_{x2}) - 8N_{yin}^4 \bmod p \quad (44)$$

$$U_2 = 2N_{yin}U_{in} \bmod p \quad (45)$$

Where $M_{xin}$, $N_{yin}$ and $U_{in}$ are the inputs that represent the point $(X_1: Y_1)$ at the first iteration, where $U_{in}$ equals one and $N_{x2}$, $N_{x2}$ and $U_2$ are the outputs that represent the point 2P.

a) Numerical Example: In this section the same cyclic group that was introduced in the description of affine re-computation of multi-stage doubling is used and some of the values that were previously computed in the previous numerical examples sections are considered in order to illustrate how the new coordinates system finds point doubling and addition correctly with a single inverse along the key size.

Assume that a key size of 4 bits represents the number $10_{10} = (1010)_2$. Then the algorithm Left-to-Right is applied in order to compute the new x and y coordinates for the point $10P = (7,11)$.

First, the algorithm scans from left to right to process the second one-bit. Each 1-bit is represented as doubling and addition while each 0-bit is represented as only doubling. Thus, the algorithm performs doubling in order to find the point 2P.

As in the description of affine re-computation of multi-stage doubling, the flowing values are considered, $$U_2 = 2$$

$$N_{x2} = 7$$

$$N_{y2} = 7$$

Then, the next bit is scanned from the left which is 1. Another double and add are applied to get $2(2P)+P=5P$.
KEY: 1 0 1 . . .
Operations: 2P 5P . . .

As in the description of intermediate operations, the values for 5P are considered as well, $$U_5 = 7$$

$$N_{x5} = 16$$

$$N_{y5} = 14$$

Note: $N_{x2}$, $N_{y2}$, $N_{x5}$ and $N_{y5}$ were computed with no inversion operation.

Now, the last bit is scanned which is 0. A doubling operation is applied to get $2(5P) = 10P = (7,11)$.
KEY: 1 0 1 0
Operations: 2P 5P 10P $$W_{10} = 3N_{x5}^2 + aU_5^4 \bmod p$$

$$W_{10} = 3(16)^2 + 2(7)^4 \bmod 17$$

$$W_{10} = 11$$

$$q_{10} = 2N_{y5} \bmod p$$

$$q_{10} = 2(14) \bmod 17$$

$$q_{10} = 11$$

$$U_{10} = q_{10} U_5 \bmod p$$

$$U_{10} = 11(7) \bmod 17$$

$$U_{14} = 9$$

$$N_{x10} = W_{10}^2 - 2N_{x5}q_{10}^2 \bmod p$$

$$N_{xin} = (11)^2 - 2(16)(11)^2 \bmod 17$$

$$N_{x10} = 6$$

$$N_{y10} = W_{10}(N_{x5}q_{10}^2 - N_{x10}) - N_{y5}q_{10}^3 \bmod p$$

$$N_{y10} = 11((16)(11)^2 - 6) - (14)(11)^3 \bmod 17$$

$$N_{y10} = 12$$

At the end of the last iteration, the inverse function is applied in order to find the affine coordinates for the point 10P.

$$x_{10} = \frac{N_{x_{10}}}{U_{10}^2} = \frac{6}{13} = 7$$

$$y_{10} = \frac{N_{y_{10}}}{U_{10}^3} = \frac{12}{15} = 11$$

Where $13^{-1} = 4$ and $15^{-1} = 8$.

Fast Multiplication with Mixed Base Multiplicands

The following is a description of a few algorithms that can integrate the fast repeated doubling techniques mentioned so far by applying mixed base multiplicands. With the algorithm mP+nQ one can compute multiplications with scalars up to 31. One can divide m's binary representation into blocks of five bits. In case an obtained block represents one of the unimplemented scalar multiplications, such blocks may be reduced in length.

A. Double and Add Extensions

Figure 11:
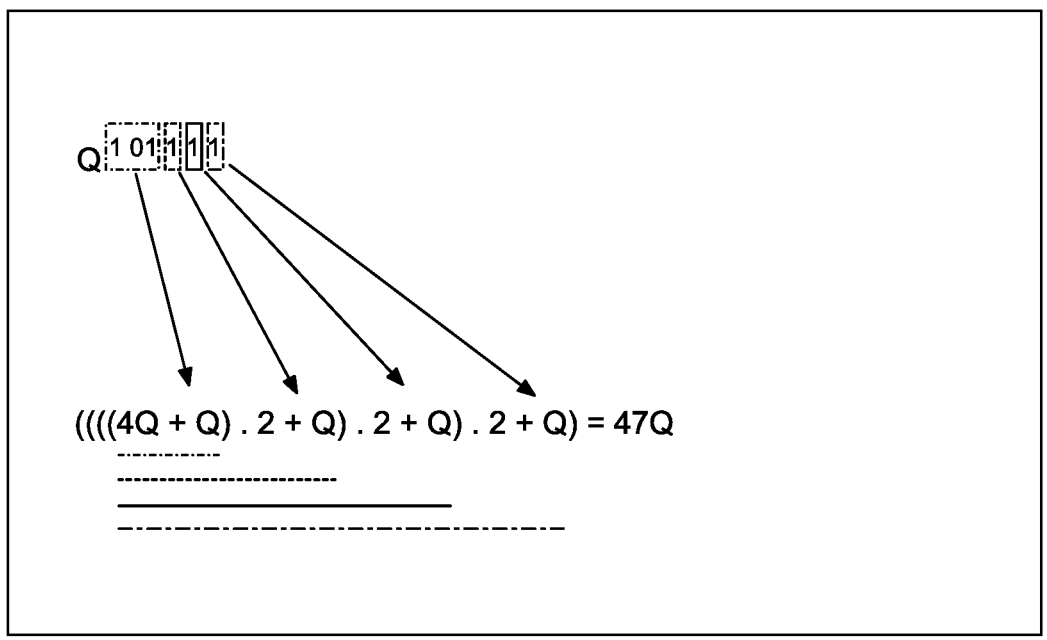
FIG. 11 illustrates a left-to-right algorithm.

In the above description of affine re-computation of multi-stage doubling and intermediate operations it is shown how to compute all intermediate exponent and mix doubling with a differential addition with a single inverse. The left-to-right algorithm starts scanning from left the next one-bit considering that the most significant bit is one. Then, it decides whether it applies doubling or doubling and addition depending on the data being read. For instance, if the first two one bits were representing the binary equivalent $(101)_2$ which is $5_{10}$, it will multiply the base by 4 because it was shifted to the left by two bits. Since the last bit scanned is a 1, it also applies a differential addition to the point being doubled with the base point. Thus, the implementation will be 4Q+Q. FIG. 11 shows a practical example for calculating $Q^{47}$. This technique computes $Q^{47}$ with only four inverses, instead of the eight inverses when performing the original equations. However, by applying the EiSi coordinate system, one can compute the whole key with a single inverse similarly to Projective.

---

Algorithm 1: Double and Add Extensions

---

```
procedure MultiplyL2Knapsack(k, P) do
    if |k| ≤ 0 ro k_{|k|-1} == 0 then return O;
    ;
    D := P;
    for (int i := |k| - 2; i ≥ 0; ) do
        l := 0;
        do
            i --;
            l ++;
        while (k_i == 0 and i ≥ 0);
        if k_i == 1 then
            D := DoubleAndAddKnapsack(D, 1, P);
        else
            D := DoubleKnapsack(D, 1);
    return D;
```

In Line 1.1 of the pseudocode of the Double-and-Add extensions the DoubleAndAddKnapsack function is applied by taking as a parameter the counter 1 that specifies the current bit location, and the base point P to be added at the end. Otherwise, the DoubleKnapsack function is applied in which the shifting to the left is computed by multiplying the D value with $2^l$.

B. Fast Multiplication with Base 32 Multiplicands

Figure 12:
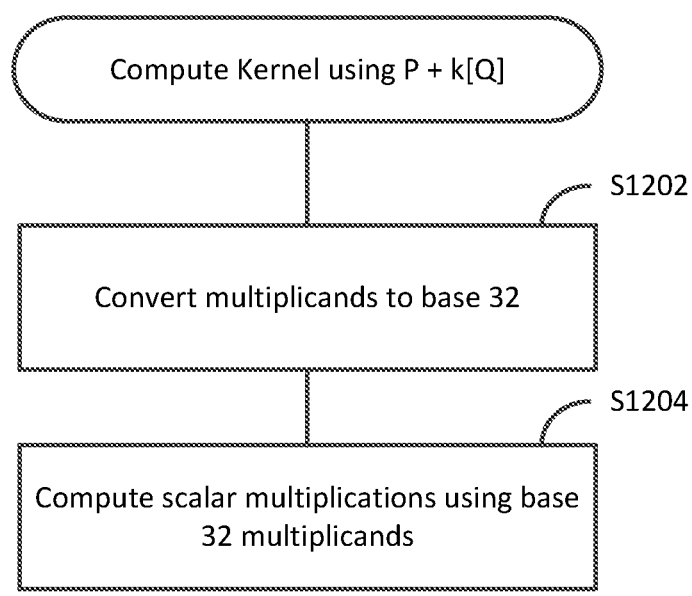
FIG. 12 is a flowchart of a further method of computing the kernel of FIG. 4 using base 32 multiplicands in accordance with an exemplary aspect of the disclosure.

A special case algorithm based on base 32 representations of the multiplicands may be used in the scalar multiplication. FIG. 12 is a flowchart of a further method of computing the kernel of FIG. 4 (in S342, S352) using base 32 multiplicands in accordance with an exemplary aspect of the disclosure. In S1202, compute the kernel K by converting multiplicands to base 32. Then, in S1204, for a multiplier of the form $\overline{qr}_{32}$ the computation is implemented by as, $$32(qP)+rP \bmod p$$

For the scalar $10150 = 27A6_{16}$, the obtained algorithm is equivalent to:

$$(32(9P)+29P)(32)+6P \bmod p$$

As noted in the above equation, and similar to Montgomery curve, the key is indistinguishable and can't be recognized by side channel attack since the algorithm applies point doubling and addition each iteration regardless of the key bit value. In addition, by applying direct doubling algorithms the scalar multiplication can be performed with a reduced number of point additions, which costs more than point doubling. Moreover, as noted in the description of EiSi, the EiSi coordinate system operates on two modes. The first is when it receives affine x and y coordinates, while the other deals with $N_x$, $N_y$ and U as inputs. The base 32 Multiplicands algorithm increases the use of the first mode, which costs fewer multiplications. Thus, the Base 32 Multiplicands algorithm is one of the most efficient scalar multiplication algorithms.

Results and Experiments

Simulation experiments are performed with a Java implementation of the disclosed algorithms. The algorithms have been applied on large parameters defined in the standard curves P-521, P-384, P-256 and P-224 from the National Institute of Standards and Technology (NIST). In addition, 10 different keys were picked that were randomly generated with an appropriate size for the x and y coordinates of each curve. Each algorithm has been executed multiple times and then the average time taken is computed to increase the accuracy of the calculations. Experimentally, the software implementation was tested on BeagleBone Black (BBB) System kit. See G. Coley, "Beaglebone black system reference manual," Texas Instruments, Dallas, vol. 5, 2013, incorporated herein by reference in its entirety. The BBB has been equipped with a minimum set of features to allow the user to experience the power of the processor.

The system is equipped with one of the ARM Cortex-A8 family, AM3358/9 processor.

A. Functions Description and Properties

In this section, a description is provided for the important functions that are used in a software implementation and their properties. As the EiSi curve receives and returns two different forms of inputs and outputs, (x,y) or ($N_x$:$N_y$:U), details of the characteristics of the EiSi curve are clarified.

a) doubling $2^nN$: This special function was designed to receive and return an EiSi point. Basically, it receives the number of doubling of a point and then builds the equation for implementing this doubling. For example, if one wants to compute the point 6P, it requires finding the point 2P then 4P in order to fulfill the constructional equation for 6P, which is 2P+4P.

b) adv_addN2N_N and adv_subN2N_N: These functions receive and return EiSi points. Briefly, they perform point addition and subtraction between two EiSi points.

c) remi_point: This function receives an affine point and return a EiSi point. In addition, it receives the number of doubling of a point and then builds the equation for implementing this doubling. Mainly, it is used in the Base 32 Multiplicands algorithm specifically for computing the remainders, where all of them based on the same base point. It differs from doubling $2^nN$ function, where all the doubling algorithms operators and labels are dependent. Basically, the point 4P can't be computed without finding the point 2P. As well as, the point 8P can't be computed without finding the point 2P then 4P. For example, if one wants to compute the third double for the base point 8P=(13,7), that is represented in EiSi coordinates as (16:14:8). The remi_point will compute the $N_x$, $N_y$ and U values for the point 2(8P) then 4(8P) then return the EiSi point of 8(8P)=7P mod 19 that is represented as (0:14:2).

d) remi_func: This function works as a control for remi_point function. The remi_func has architectures of all the doubling algorithms and how they are implemented. Essentially, it has flags to be checked to avoid repeating any previously computed operations. FIG. 13 and FIG. 14, shows practical examples that were printed from an implementation debug page.

As shown in FIG. 13, the second block 2P parameters were not recomputed as well as at the third block for 8P.

Also, in FIG. 14, at the last block it can be seen that 8P and 3P were previously computed and had only performed the point addition.

B. Comparison to Original

In this section, algorithms are compared in terms of number of multiplications, Base 32 Multiplicands and Double and Add, with the original affine algorithm. The original affine equations have been implemented with two different algorithms, Right-to-Left and Left-to-Right. Table III shows the substantial differences in the number of multiplications and inversions between these algorithms.

TABLE III

OUR WORK VS ORIGINAL ALGORITHMS MEASUREMENTS.

| NIST Curve | Algorithm | Number of Operations | |
|---|---|---|---|
| | | Mults | Invs |
| P-521 | RL (Original) | 658514 | 1059 |
| | LR (Original) | 478056 | 778 |
| | DA | 9162 | 1 |
| | Base 32 | 7921 | 1 |
| P-384 | RL (Original) | 355788 | 775 |
| | LR (Original) | 359177 | 569 |
| | DA | 6714 | 1 |
| | Base 32 | 5890 | 1 |
| P-256 | RL (Original) | 162131 | 519 |
| | LR (Original) | 115340 | 378 |
| | DA | 4466 | 1 |
| | Base 32 | 4007 | 1 |
| P-224 | RL (Original) | 123461 | 450 |
| | LR (Original) | 88921 | 332 |
| | DA | 3921 | 1 |
| | Base 32 | 3529 | 1 |

Figure 15:
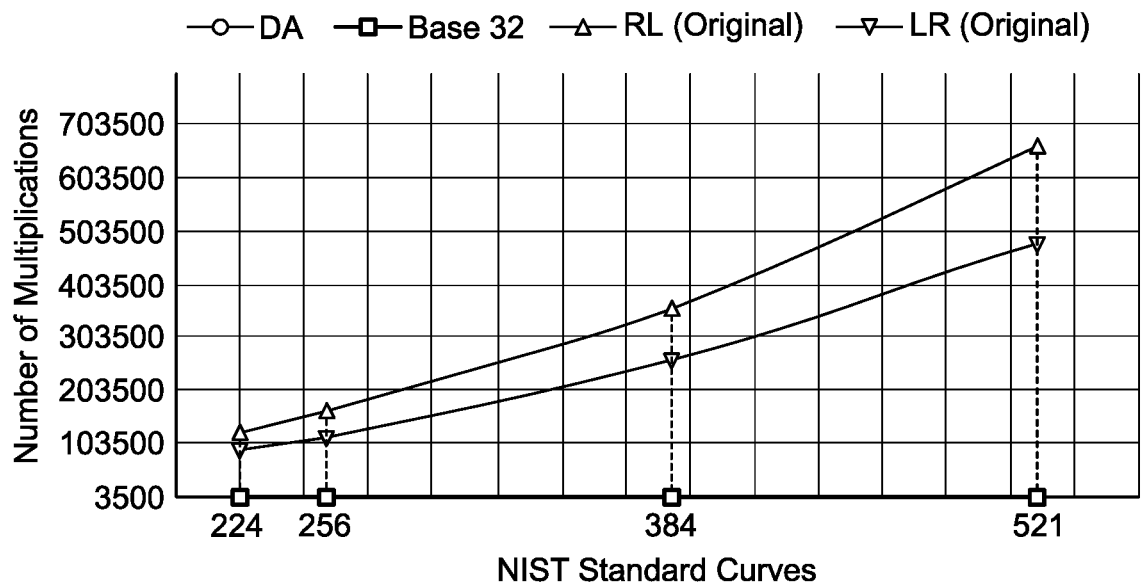
FIG. 15 is a graph illustrating present work vs original algorithms in terms of number of multiplications.

As in Table III, the great difference in number of multiplications and inversions between the present algorithm and the original can be seen as the present algorithm is faster by approximately 35 up to 83 times for the key size 224 bits and 521 bits respectively in case of comparing with RL and 25 up to 60 times in case of LR. This difference is due to the number of inverse operations that the original algorithm requires each point doubling or addition operation. FIG. 15 is a graph that illustrates this difference in chart where the present algorithm appears as a straight line along the x-axis.

C. EiSi Coordinates vs Others

Here, a comparison between the present algorithm and the other coordinates systems, Projective and Jacobian. Table IV shows a comparison of these algorithms in terms of the number of additions, subtractions, multiplications, divisions, modulos, maximum levels of parallelization and elapsed time for implementing them on the NIST standard curves P-521, P-384, P-256 and P-224.

TABLE IV

EISI VS OTHER COORDINATES MEASUREMENTS.

| NIST Curve | Algorithm | Number of Operations | | | | | |
|---|---|---|---|---|---|---|---|
| | | Mults | Divs | ALUs | Mods | Maxls | Time ms |
| P-521 | Projective | 14900 | 315 | 4211 | 17899 | 9390 | 1035 |
| | Jacobian | 13312 | 301 | 4197 | 15821 | 8862 | 884 |
| | Base 32 | 7921 | 296 | 6518 | 12290 | 7123 | 778 |
| | DA | 9162 | 301 | 7848 | 18528 | 9924 | 951 |
| P-384 | Projective | 10901 | 223 | 3078 | 13107 | 6871 | 554 |
| | Jacobian | 9752 | 222 | 3075 | 11587 | 6491 | 480 |
| | Base 32 | 5890 | 227 | 4833 | 9113 | 5224 | 421 |
| | DA | 6714 | 222 | 5746 | 13556 | 7267 | 508 |

TABLE IV-continued

EISI VS OTHER COORDINATES MEASUREMENTS.

| NIST Curve | Algorithm | Number of Operations | | | | | |
|---|---|---|---|---|---|---|---|
| | | Mults | Divs | ALUs | Mods | Maxls | Time ms |
| P-256 | Projective | 7236 | 145 | 2043 | 8714 | 4564 | 286 |
| | Jacobian | 6488 | 147 | 2046 | 7708 | 4316 | 261 |
| | Base 32 | 4007 | 150 | 3277 | 6210 | 3463 | 227 |
| | DA | 4466 | 147 | 3820 | 9028 | 4833 | 266 |
| P-224 | Projective | 6356 | 127 | 1796 | 7656 | 4010 | 234 |
| | Jacobian | 5697 | 127 | 1796 | 6773 | 3790 | 215 |
| | Base 32 | 3529 | 132 | 2886 | 5472 | 3041 | 193 |
| | DA | 3921 | 127 | 3354 | 7931 | 4243 | 218 |

Figure 16:
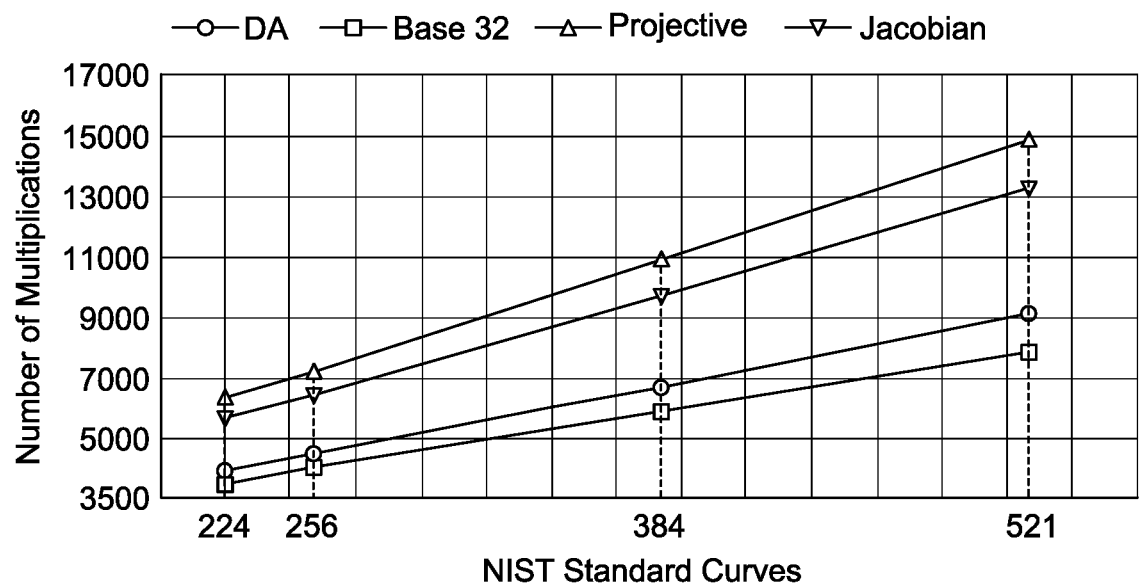
FIG. 16 is a graph illustrating present work vs other coordinates algorithms in terms of number of multiplications.
Figure 17:
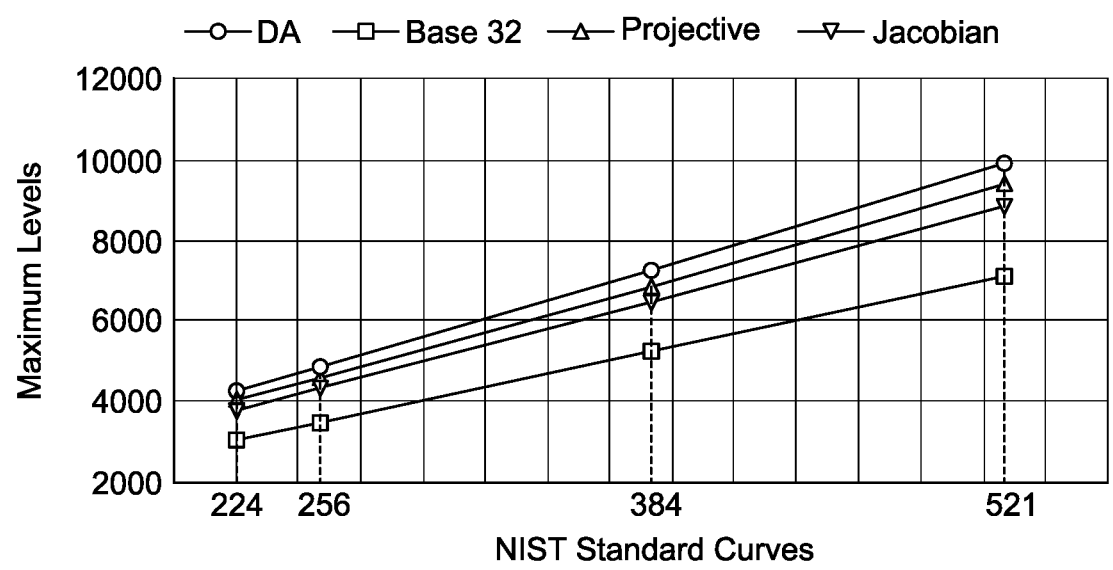
FIG. 17 is a graph illustrating present work vs other coordinates algorithms in terms of number of maximum levels.

As can be seen in Table IV, the present algorithm as represented in the last two algorithms are more efficient when it comes to number of multiplications. Clearly, Base 32 Multiplicands is the optimal algorithm in this case. Moreover, when comparing the maximum level of parallelization, the present algorithm outperforms the other coordinates algorithms as well through Base 32 Multiplicands which makes it the optimal algorithm in terms of both factors. Nevertheless, Double and Add algorithm (DA) which represents original EiSi coordinates appears to be the least efficient in terms of maximum levels. However together with the direct doubling technique of the present algorithm DA outperforms all other algorithms in all aspects. FIG. 16 and FIG. 17 contain graphs that show the comparisons between the present algorithm DA and the other coordinates algorithms in terms of number of multiplications and maximum level of parallelization with different key sizes.

As can be seen in FIG. 16 and FIG. 17, all algorithms are graphed in straight lines of varying slopes which allows the opportunity to apply a straight line equation to any algorithm to predict the expected values, whether it is the number of multiplications or the maximum levels of parallelization at the level of a larger key size. Table V lists all the equations related to each algorithm.

TABLE V

LIST OF ALGORITHMS LINEAR EQUATONS.

| Algorithm | Number of Mults Eq. | Number of MaxLs Eq. |
|---|---|---|
| Base 32 | y = 14.777x + 220.37 | y = 13.762x − 52.445 |
| DA | y = 17.658x − 48.287 | y = 19.139x − 60.183 |
| Jacobian | y = 25.656x − 70.992 | y = 17.089x − 52.485 |
| Projective | y = 28.795x − 121.85 | y = 18.131x − 69.095 |

Predictably, the equations in Table V are applied on two key sizes of the prime numbers of 751 and 1013. Table VI lists the expected number of multiplications and maximum levels.

TABLE V

EXPECTED NUMBER OF MULTS AND MAXLS WITH KEY OF SIZES 751 AND 1013.

| Algorithm | Expected Number of Mults | | Expected Number of MaxLs | |
|---|---|---|---|---|
| | 751 | 1013 | 751 | 1013 |
| Base 32 | 11317 | 15189 | 10282 | 13888 |
| DA | 13112 | 17839 | 14313 | 19327 |

TABLE V-continued

EXPECTED NUMBER OF MULTS AND MAXLS WITH KEY OF SIZES 751 AND 1013.

| Algorithm | Expected Number of Mults | | Expected Number of MaxLs | |
| --- | --- | --- | --- | --- |
|  | 751 | 1013 | 751 | 1013 |
| Jacobian | 19196 | 15918 | 12781 | 17258 |
| Projective | 21503 | 29047 | 13547 | 18297 |

As it can be seen in Table VI, the present algorithm which is represented in Base 32 Multiplicands maintains its place as the optimal algorithm in terms of number of multiplications and maximum levels of parallelization. Likewise, the Jacobian algorithm outperforms Projective in terms of the same factors. As such, another comparison can be made between Base 32 Multiplicands and the Jacobian coordinates algorithm to monitor if the difference in performance will shrink with the size of the key or continue to increase. Despite the slope values in the straight-line equations that show the differences, the delta value, $\Delta$, is computed which is the difference between the y-axis values along the key size. Table VII shows the comparison between these two algorithms in terms of the same two factors, where, $$\Delta_i = y_n - y_m \quad (46)$$

Where i represents the key size and n and m represent the algorithms labels.

TABLE VII $\Delta$ VALUES FOR BASE 32 VS JACOBIAN.

| Key Size | Number of Mults Base 32 vs Jacobian | Number of MaxLs Base 32 vs Jacobian |
| --- | --- | --- |
| 724 | 2168 | 749 |
| 256 | 2481 | 853 |
| 384 | 3862 | 1267 |
| 521 | 5391 | 1739 |
| 751 | 7879 | 2499 |
| 1013 | 10729 | 3370 |

It can be seen from the A values from Table VII, that the results in both cases show that the improvement scales with the size of the input.

D. Number of Multipliers Comparison

After tests and comparisons have proven the efficiency of the present algorithms and overcoming other coordinates systems algorithms, in this section the number of multiplications units each algorithm requires are specified to achieve the maximum levels of parallelization. Table VIII shows the number of multipliers per algorithm in the case of a key size 521.

TABLE VIII

THE NUMBER OF MULTIPLIERS APPROPRIATE TO ACHIEVE THE HIGHEST LEVEL OF PARALLELISM.

| Algorithm | Number of MaxLs | Multipliers |
| --- | --- | --- |
| DA | 9970 | 3 |
| Base 32 | 7133 | 3 |
| Projective | 9370 | 6 |
| jaanian | 8862 | 4 |

As it can be seen in Table VIII, the appropriate number of multipliers to achieve the highest level of parallelism varies between algorithms. In addition, it is noted that if the number of multipliers is reduced a little, there may be very close result in terms of maximum levels of prallelization. Thus, another close comparison can be made in which the behavior of each algorithm is monitored in comparison with the others in multiple cases where the number of multipliers is uniform. Table IX shows another comparison between the present optimal algorithm that is specified in the previous sections compared to Jacobian, in terms of the MaxLs at specific number of multipliers.

TABLE IX

MAXL AT DIFFERENT NUMBER OF MULTIPLIERS.

| Multipliers | Algorithm | Number of MaxLs |
| --- | --- | --- |
| 1 | Base 32 | 7982 |
|  | Jacobian | 13011 |
| 2 | Base 32 | 7134 |
|  | Jacobian | 8864 |
| 3 | Base 32 | 7133 |
|  | Jacobian | 8863 |
| 4 | Base 32 | 7133 |
|  | Jacobian | 8862 |

Figure 18:
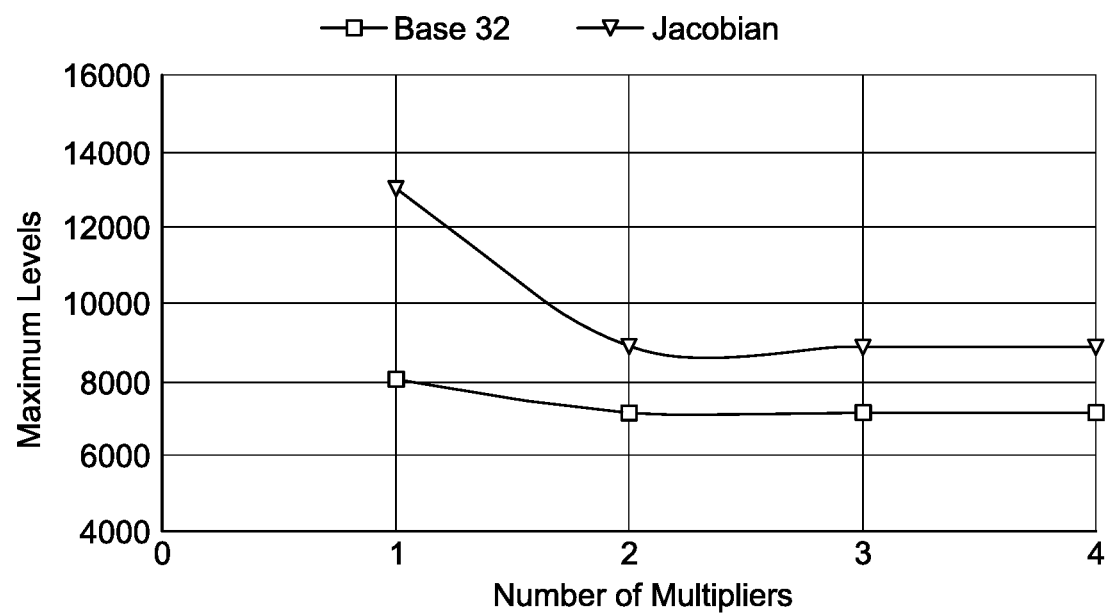
FIG. 18 is a graph illustrating the maximum levels for different number of multipliers.

As it can be seen in Table IX, the present algorithms out perform the Jacobian algorithm in all levels, starting from a single multiplier, where the Base 32 algorithm appears to be 63% more efficient, up to 4 multipliers, where Jacobian reaches its peak with 24% slower than Base 32. At the 2 multipliers case, the performance of both algorithms improves significantly as the difference in efficiency becomes almost 24% with the preference remaining for the present algorithm. It can be noted that the Base 32 and Jacobian algorithms become highly ineffective as they continue to increase by one parallel level by increasing the number of multiplication units each time until they reach their peak. At the end, and in all cases, whether fewer or more multipliers are used, the efficiency of the present algorithm clearly outweighs the work of other coordinates systems algorithms. FIG. 18 shows the graphical representation of the relationship of the number of multipliers with the maximum levels of parallelism.

The invention claimed is:

1. A system for secure communication, the system comprising:
    a first computer system;
    a communication network; and
    a second computer system,
    wherein
    the first computer system and the second computer system are each provided with a public elliptic curve E,
    the first computer system and the second computer system each independently determine kernels $K_A$ and $K_B$, respectively, and an isogeny mapping using the public elliptic curve E,
    the first computer system and the second computer system each independently determine mapped points based on the respective isogeny mappings,
    the first computer system and the second computer system each exchange the determined mapped points,
    the first computer system and the second computer system each independently compute the coefficients of two different secret elliptic curves under two different secret isogenies, the first computer system and the second computer system each independently compute a common secret key using the secret elliptic curves and the secret isogenies, and the first computer system and the second computer system exchange messages using the common secret key, and wherein the first computer system and the second computer system each determine kernels $K_A$ and $K_B$ including computing mP+nQ by accessing a lookup table stored in a memory that contains a range of doubles of an end point of the respective kernels, where P and Q are points on the public elliptic curve and m and n are integers.

2. The system of claim 1, wherein in the computing the secret isogenies, the first computer system and the second computer system each computes a respective kernel $K_{BA}$ and $K_{AB}$ using mixed-base multiplicands with a single inversion.

3. The system of claim 1, wherein in the determining of the kernels $K_A$ and $K_B$, the first computer system and the second computer system each computes the kernel by replacing all variables that are related to the order of the desired double such that an advanced double is performed directly, by determining:

$$W_n = 3N_{xn/2}^2 + aU_{n/2}^4 \bmod p \tag{15}$$

$$q_n = 2N_{yn/2} \bmod p$$

$$U_n = q_n U_{n/2} \bmod p \tag{16}$$

$$x_n = \frac{W_n^2 - 2N_{x_{n/2}} q_n^2}{U_n^2} \bmod p \tag{17}$$

$$x_n = \frac{N_{x_n}}{U_n^2} \bmod p \tag{18}$$

$$N_{xn} = W_n^2 - 2N_{xn/2} q_n^2 \tag{19}$$

$$y_n = \frac{W_n(N_{x_{n/2}} q_n^2 - N_{x_n}) - N_{y_{n/2}} q_n^3}{U_n^3} \bmod p \tag{20}$$

$$y_n = \frac{N_{y_n}}{U_n^3} \bmod p \tag{21}$$

$$N_{y_n} = W_n(N_{x_{n/2}} q_n^2 - N_{x_n}) - N_{y_{n/2}} q_n^3 \tag{22}$$

where n is the order of the double and n/2 is assigned to the previous power of 2 double, $N_{xn}$ and $N_{yn}$ are numerators of x and y coordinates, $U_n$ is a projective parameter.

4. The system of claim 3, wherein in the determining of the kernels $K_A$ and $K_B$, the first computer system and the second computer system each computes the kernel by mixing the advanced doubling with the addition and the computation is performed with a single inversion, by performing:

$$x_{n+m} = \frac{W_{n+m}^2 - x_1 U_{n+m}^2 - N_{x_n} q_{n+m}^2}{U_{n+m}^2} \bmod p \tag{28}$$

$$x_{n+m} = \frac{N_{x_{n+m}}}{U_{n+m}^2} \bmod p$$

$$y_{n+m} = \frac{W_{n+m}(x_1 U_{n+m}^2 - N_{x_{n+m}}) - y_1 U_{n+m}^3}{U_{n+m}} \bmod p \tag{29}$$

$$y_{n+m} = \frac{N_{y_{n+m}}}{U_{n+m}^3} \bmod p.$$

5. The system of claim 3, wherein in the determining of the kernels $K_A$ and $K_B$, the first computer system and the second computer system each computes intermediate scalar multiplications of the form $2^nP+P$, $2^nP+2P$, $2(nP)$, and $2(nP)+P$.

6. The system of claim 1, wherein in the determining of the kernels $K_A$ and $K_B$, the first computer system and the second computer system each computes the common secret key using an extraction of coordinates system, where each point $P_A=(N_A: N_{yA}: U_A)$ is represented in affine coordinates as $(N_{xA}/U_A^2, N_{yA}/U_A^3)$.

7. The system of claim 6, further comprising:

the first computer system and the second computer system each perform doubling operations using operators for the affine coordinates, and perform adding using the operators for the affine coordinates.

8. The system of claim 2, wherein the first computer system and the second computer system each compute the respective kernel $K_{BA}$ and $K_{AB}$ by converting the multiplicands to base 32, and compute scalar multiplications using the base 32 multiplicands.

9. A supersingular isogeny-based cryptography method, the method comprising:

providing a first computer system and a second computer system with a public elliptic curve E, independently determining, by the first computer system and the second computer system, kernels $K_A$ and $K_B$, respectively, and an isogeny mapping using the public elliptic curve E, independently determining, by the first computer system and the second computer system, mapped points based on the respective isogeny mappings, exchanging, between the first computer system and the second computer system, the determined mapped points, independently computing, by the first computer system and the second computer system, coefficients of two different secret elliptic curves under two different secret isogenies, independently determining, by the first computer system and the second computer system, a common secret key using the secret elliptic curves and the secret isogenies, and exchanging, between the first computer system and the second computer system, messages using the common secret key, and wherein the first computer system and the second computer system each determine kernels $K_A$ and $K_B$ including computing mP+nQ by accessing a lookup table stored in a memory that contains a range of doubles of an end point of the respective kernels, where P and Q are points on the public elliptic curve and m and n are integers.

10. The method of claim 9, wherein the computing the secret isogenies, further includes computing, by the first computer system and the second computer system, a respective kernel $K_{BA}$ and $K_{AB}$ using mixed-base multiplicands with a single inversion.

11. The method of claim 9, wherein the determining of the kernels $K_A$ and $K_B$, further includes computing, by the first computer system and the second computer system, the kernel by replacing all variables that are related to the order of the desired double such that an advanced double is performed directly, by determining:

$$W_n = 3N_{xn/2}^2 + aU_{n/2}^4 \bmod p \quad (15)$$

$$q_n = 2N_{yn/2} \bmod p$$

$$U_n = q_n U_{n/2} \bmod p \quad (16)$$

$$x_n = \frac{W_n^2 - 2N_{x_{n/2}} q_n^2}{U_n^2} \bmod p \quad (17)$$

$$x_n = \frac{N_{x_n}}{U_n^2} \bmod p \quad (18)$$

$$N_{xn} = W_n^2 - 2N_{xn/2} q_n^2 \quad (19)$$

$$y_n = \frac{W_n(N_{x_{n/2}} q_n^2 - N_{x_n}) - N_{y_{n/2}} q_n^3}{U_n^3} \bmod p \quad (20)$$

$$y_n = \frac{N_{y_n}}{U_n^3} \bmod p \quad (21)$$

$$N_{y_n} = W_n(N_{x_{n/2}} q_n^2 - N_{x_n}) - N_{y_{n/2}} q_n^3 \quad (22)$$

where n is the order of the double and n/2 is assigned to the previous power of 2 double, $N_{xn}$ and $N_{yn}$ are numerators of x and y coordinates, $U_n$ is a projective parameter.

12. The method of claim 11, wherein the determining of the kernels $K_A$ and $K_B$, further includes, computing, by the first computer system and the second computer system, the kernel by mixing the advanced doubling with the addition and the computation is performed with a single inversion, by performing:

$$x_{n+m} = \frac{W_{n+m}^2 - x_1 U_{n+m}^2 - N_{x_n} q_{n+m}^2}{U_{n+m}^2} \bmod p \quad (28)$$

$$x_{n+m} = \frac{N_{x_{n+m}}}{U_{n+m}^2} \bmod p$$

$$y_{n+m} = \frac{W_{n+m}(x_1 U_{n+m}^2 - N_{x_{n+m}}) - y_1 U_{n+m}^3}{U_{n+m}} \bmod p \quad (29)$$

$$y_{n+m} = \frac{N_{y_{n+m}}}{U_{n+m}^3} \bmod p.$$

13. The method of claim 11, wherein the determining of the kernels $K_A$ and $K_B$, further includes computing, by the first computer system and the second computer system, intermediate scalar multiplications of the form $2^n P + P$, $2^{11} P + 2P$, $2(nP)$, and $2(nP)+P$.

14. The method of claim 9, wherein the determining of the kernels $K_A$ and $K_B$, further includes, computing, by the first computer system and the second computer system, the common secret key using an extraction of coordinates system, where each point $P_A = (N_{xA} : N_{yA} : U_A)$ is represented in affine coordinates as $(N_{xA}/U_A^2, N_{yA}/U_A^3)$.

15. The method of claim 14, further comprising:
performing doubling operations using operators for the affine coordinates, and
performing adding using the operators for the affine coordinates.

16. The method of claim 10, further comprising, computing, by the first computer system and the second computer system, the respective kernel $K_{BA}$ and $K_{AB}$ by converting the multiplicands to base 32, and computing scalar multiplications using the base 32 multiplicands.

17. A non-transitory computer-readable medium storing instructions that are operable when executed by processing circuitry to perform operations comprising:
receiving a public elliptic curve E,
independently determining kernels $K_A$ and $K_B$, respectively, and an isogeny mapping using the public elliptic curve E,
independently determining mapped points based on the respective isogeny mappings,
exchanging the determined mapped points,
independently computing coefficients of two different secret elliptic curves under two different secret isogenies,
independently determining a common secret key using the secret elliptic curves and the secret isogenies, and
exchanging messages using the common secret key, and
determining kernels $K_A$ and $K_B$ by computing mP+nQ by accessing a lookup table stored in a memory that contains a range of doubles of an end point of the respective kernels, where P and Q are points on the public elliptic curve and m and n are integers.

18. The non-transitory computer-readable medium of claim 17, wherein the computing the secret isogenies, further includes computing a respective kernel $K_{BA}$ and $K_{AB}$ using mixed-base multiplicands with a single inversion.

19. The non-transitory computer-readable medium of claim 18, wherein the determining of the kernels $K_A$ and $K_B$, further includes, computing the common secret key using an extraction of coordinates system, where each point $P_A = (N_A : N_{yA} : U_A)$ is represented in affine coordinates as $(N_{xA}/U_A^2, N_{yA}/U_A^3)$.

20. The non-transitory computer-readable medium of claim 18, further comprising, computing the respective kernel $K_{BA}$ and $K_{AB}$ by converting the multiplicands to base 32, and computing scalar multiplications using the base 32 multiplicands.

* * * * *